(12) United States Patent
Henri et al.

(10) Patent No.: US 10,317,554 B2
(45) Date of Patent: Jun. 11, 2019

(54) NOISE ATTENUATION VIA THRESHOLDING IN A TRANSFORM DOMAIN

(71) Applicant: SCHLUMBERGER TECHNOLOGY CORPORATION, Sugar Land, TX (US)

(72) Inventors: Antoun Henri, Katy, TX (US); Ian Moore, New Plymouth (NZ)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 483 days.

(21) Appl. No.: 14/960,323

(22) Filed: Dec. 4, 2015

(65) Prior Publication Data

US 2016/0161621 A1 Jun. 9, 2016

Related U.S. Application Data

(60) Provisional application No. 62/088,340, filed on Dec. 5, 2014.

(51) Int. Cl.
*G01V 1/28* (2006.01)
*G01V 1/36* (2006.01)
*G01V 1/32* (2006.01)
*G01V 1/30* (2006.01)

(52) U.S. Cl.
CPC ............. *G01V 1/364* (2013.01); *G01V 1/282* (2013.01); *G01V 1/32* (2013.01); *G01V 1/301* (2013.01); *G01V 2210/24* (2013.01); *G01V 2210/324* (2013.01); *G01V 2210/34* (2013.01); *G01V 2210/40* (2013.01)

(58) Field of Classification Search
None
See application file for complete search history.

(56) References Cited

U.S. PATENT DOCUMENTS

| 2012/0215453 | A1 | 8/2012 | Poole |
| 2014/0019055 | A1 | 1/2014 | Kustowski et al. |
| 2014/0126781 | A1 | 5/2014 | Poole |
| 2014/0278118 | A1 | 9/2014 | Tegtmeier-Last et al. |
| 2014/0340987 | A1* | 11/2014 | Kluver ................... G01V 1/364 367/21 |

FOREIGN PATENT DOCUMENTS

WO 2013106642 A1 7/2013

OTHER PUBLICATIONS

International Search Report issued in related PCT application PCT/US2015/064198 dated Feb. 22, 2016, 3 pages.
International Preliminary Report on Patentability for the equivalent International patent application PCT/US2015/064198 dated Jun. 15, 2017.

* cited by examiner

Primary Examiner — Mischita L Henson
Assistant Examiner — Christine Y Liao
(74) Attorney, Agent, or Firm — Michael Guthrie

(57) ABSTRACT

A method can include receiving data in a data domain where a first portion of the data domain includes a signal to noise ratio that exceeds a signal to noise ratio in a second portion of the data domain; generating a model; in a transform domain, based at least in part on the model, filtering at least a portion of the data in the second portion of the data domain; and, based at least in part on the filtering, outputting noise attenuated data for at least a portion of the data in the second portion of the data domain.

17 Claims, 19 Drawing Sheets

US 10,317,554 B2

NOISE ATTENUATION VIA THRESHOLDING IN A TRANSFORM DOMAIN

RELATED APPLICATION

This application claims the benefit of and priority to a U.S. Provisional Application having Ser. No. 62/088,340, filed 5 Dec. 2014 (expired), which is incorporated by reference herein.

BACKGROUND

Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Various techniques described herein pertain to processing of data such as, for example, seismic data.

SUMMARY

A method can include receiving data in a data domain where a first portion of the data domain includes a signal to noise ratio that exceeds a signal to noise ratio in a second portion of the data domain; generating a model; in a transform domain, based at least in part on the model, filtering at least a portion of the data in the second portion of the data domain; and, based at least in part on the filtering, outputting noise attenuated data for at least a portion of the data in the second portion of the data domain. A system can include a processor; memory operatively coupled to the processor; and processor-executable instructions stored in the memory to instruct the system to: receive data in a data domain where a first portion of the data domain includes a signal to noise ratio that exceeds a signal to noise ratio in a second portion of the data domain; generate a model; in a transform domain, based at least in part on the model, filter at least a portion of the data in the second portion of the data domain; and, based at least in part on the filter of at least a portion of the data in the second portion of the data domain, output noise attenuated data for at least a portion of the data in the second portion of the data domain. One or more computer-readable storage media can include processor-executable instructions to instruct a computing system to: receive data in a data domain where a first portion of the data domain includes a signal to noise ratio that exceeds a signal to noise ratio in a second portion of the data domain; generate a model; in a transform domain, based at least in part on the model, filter at least a portion of the data in the second portion of the data domain; and, based at least in part on the filter of at least a portion of the data in the second portion of the data domain, output noise attenuated data for at least a portion of the data in the second portion of the data domain. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks.

Figure 1:
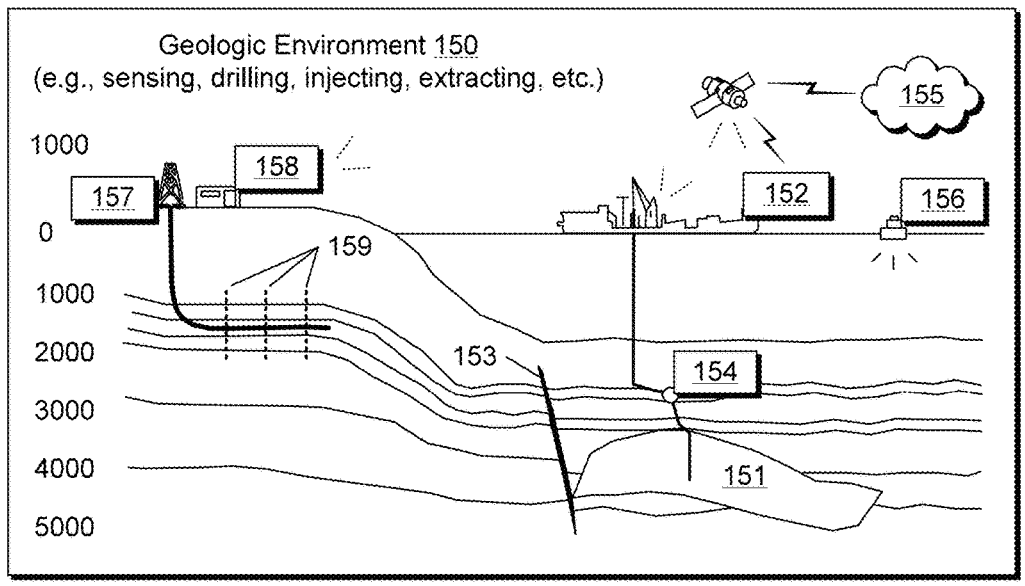
FIG. 1 illustrates an example of a geologic environment and an example of a technique.
Figure 1:
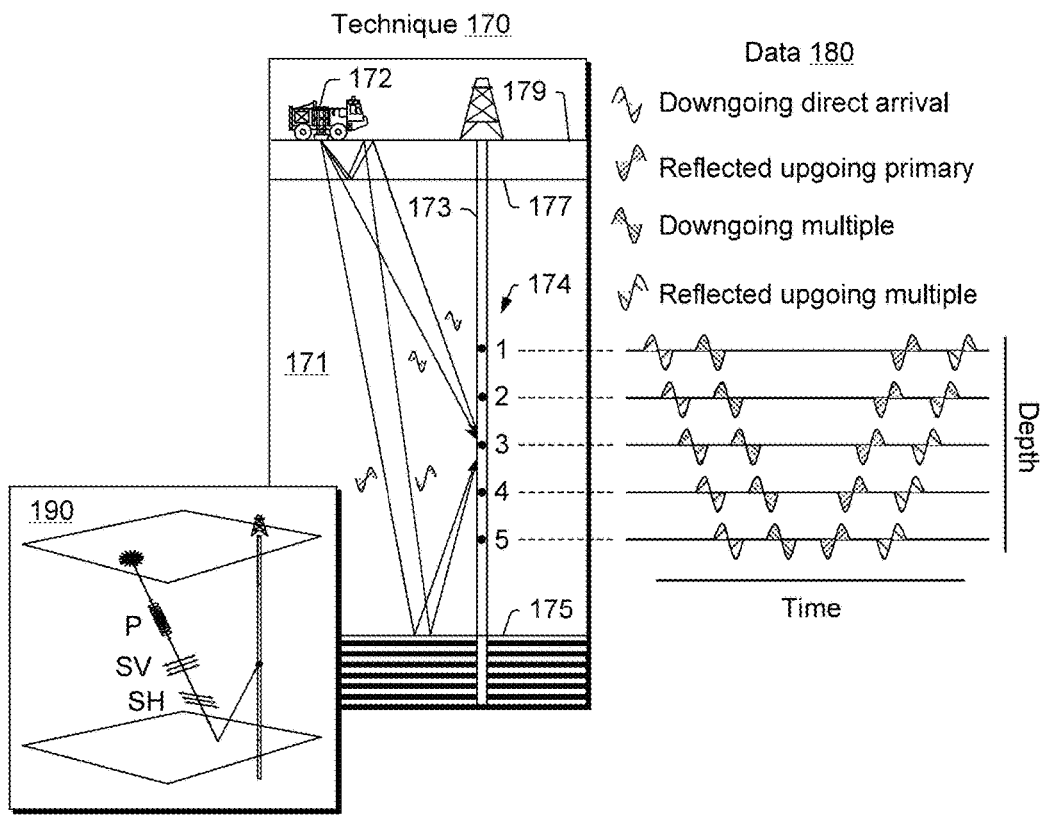

FIG. 1 shows an example of a geologic environment 150 (e.g., an environment that includes a sedimentary basin, a reservoir 151, one or more fractures 153, etc.) and an example of an acquisition technique 170 to acquire seismic data. As an example, a system may process data acquired by the technique 170, for example, to allow for direct or indirect management of sensing, drilling, injecting, extracting, etc., with respect to the geologic environment 150. In turn, further information about the geologic environment 150 may become available as feedback (e.g., optionally as input to the system).

As an example, a system may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

As an example, a system may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

In the example of FIG. 1, the geologic environment 150 may include layers (e.g., stratification) that include a reservoir 151 and that may be intersected by a fault 153. As an example, a geologic environment may be or include an offshore geologic environment, a seabed geologic environment, an ocean bed geologic environment, etc.

As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

In FIG. 1, the technique 170 may be implemented with respect to a geologic environment 171. As shown, an energy source (e.g., a transmitter) 172 may emit energy where the energy travels as waves that interact with the geologic environment 171. As an example, the geologic environment 171 may include a bore 173 where one or more sensors (e.g., receivers) 174 may be positioned in the bore 173. As an example, energy emitted by the energy source 172 may interact with a layer (e.g., a structure, an interface, etc.) 175 in the geologic environment 171 such that a portion of the energy is reflected, which may then be sensed by one or more of the sensors 174. Such energy may be reflected as an upgoing primary wave (e.g., or "primary"). As an example, a portion of emitted energy may be reflected by more than one structure in the geologic environment and referred to as a multiple reflected wave (e.g., or "multiple"). For example, the geologic environment 171 is shown as including a layer 177 that resides below a surface layer 179. Given such an environment and arrangement of the source 172 and the one or more sensors 174, energy may be sensed as being associated with particular types of waves.

As shown in FIG. 1, acquired data 180 can include data associated with downgoing direct arrival waves, reflected upgoing primary waves, downgoing multiple reflected waves and reflected upgoing multiple reflected waves. The acquired data 180 is also shown along a time axis and a depth axis. As indicated, in a manner dependent at least in part on characteristics of media in the geologic environment 171, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that can characterize anisotropy of media (e.g., seismic anisotropy), consider the Thomsen parameters $\varepsilon$, $\delta$ and $\gamma$. The Thomsen parameter $\delta$ can describe offset effects (e.g., short offset). As to the Thomsen parameter $\varepsilon$, it can describe offset effects (e.g., a long offset)

and can relate to a difference between vertical and horizontal compressional waves (e.g., P or P-wave or quasi compressional wave qP or qP-wave). As to the Thomsen parameter $\gamma$, it can describe a shear wave effect. For example, consider an effect as to a horizontal shear wave with horizontal polarization to a vertical shear wave.

As an example, seismic data may be acquired for a region in the form of traces. In the example of FIG. 1, the technique 170 may include the source 172 for emitting energy where portions of such energy (e.g., directly and/or reflected) may be received via the one or more sensors 174. As an example, energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Figure 2:
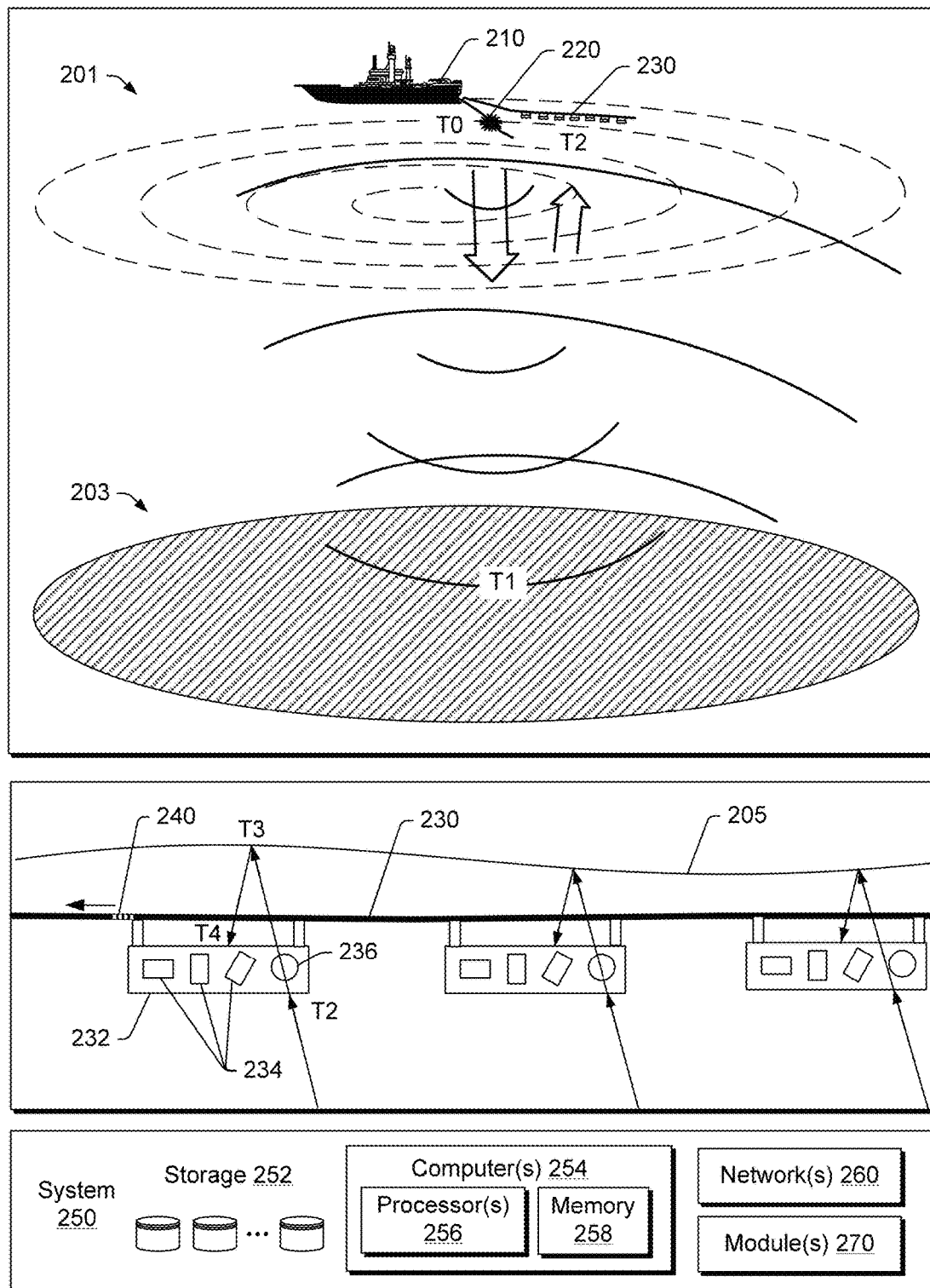
FIG. 2 illustrates an example of a geologic environment and examples of equipment.

FIG. 2 shows an example of a geologic environment 201 that includes a seabed 203 and a sea surface 205. As shown, equipment 210 such as a ship may tow an energy source 220 and a string of sensors 230 at a depth below the sea surface 205. In such an example, the energy source 220 may emit energy at a time T0, a portion of that energy may be reflected from the seabed 203 at a time T1 and a portion of that reflected energy may be received at the string of sensors 230 at a time T2.

As mentioned with respect to the technique 170 of FIG. 1, a wave may be a primary or a multiple. As shown in an enlarged view of the geologic environment 201, the sea surface 205 may act to reflect waves such that sensors 232 of the string of sensors 230 may sense multiples as well as primaries. In particular, the sensors 232 may sense so-called sea surface multiples, which may be multiples from primaries or multiples of multiples (e.g., due to sub-seabed reflections, etc.).

As an example, each of the sensors 232 may sense energy of an upgoing wave at a time T2 where the upgoing wave reflects off the sea surface 205 at a time T3 and where the sensors may sense energy of a downgoing multiple reflected wave at a time T4 (see also the data 180 of FIG. 1 and data 240 of FIG. 2). In such an example, sensing of the downgoing multiple reflected wave may be considered noise that interferes with sensing of one or more upgoing waves. As an example, an approach that includes summing data acquired by a geophone and data acquired by a hydrophone may help to diminish noise associated with downgoing multiple reflected waves. Such an approach may be employed, for example, where sensors may be located proximate to a surface such as the sea surface 205 (e.g., arrival times T2 and T4 may be relatively close). As an example, the sea surface 205 or a water surface may be an interface between two media. For example, consider an air and water interface. As an example, due to differing media properties, sound waves may travel at about 1,500 m/s in water and at about 340 m/s in air. As an example, at an air and water interface, energy may be transmitted and reflected.

As an example, each of the sensors 232 may include at least one geophone 234 and a hydrophone 236. As an example, a geophone may be a sensor configured for seismic acquisition, whether onshore and/or offshore, that can detect velocity produced by seismic waves and that can, for example, transform motion into electrical impulses. As an example, a geophone may be configured to detect motion in a single direction. As an example, a geophone may be configured to detect motion in a vertical direction. As an example, three mutually orthogonal geophones may be used in combination to collect so-called 3C seismic data. As an example, a hydrophone may be a sensor configured for use in detecting seismic energy in the form of pressure changes under water during marine seismic acquisition. As an example, hydrophones may be positioned along a string or strings to form a streamer or streamers that may be towed by a seismic vessel (e.g., or deployed in a bore). Thus, in the example of FIG. 2, the at least one geophone 234 can provide for motion detection and the hydrophone 236 can provide for pressure detection. As an example, the data 240 (e.g., analog and/or digital) may be transmitted via equipment, for example, for processing, etc.

As an example, a method may include analysis of hydrophone response and vertical geophone response, which may help to improve a PZ summation, for example, by reducing receiver ghost and/or free surface-multiple noise contamination. As an example, a ghost may be defined as a reflection of a wavefield as reflected from a water surface (e.g., water and air interface) that is located above a receiver, a source, etc. (e.g., a receiver ghost, a source ghost, etc.). As an example, a receiver may experience a delay between an upgoing wavefield and its downgoing ghost, which may depend on depth of the receiver.

As an example, a surface marine cable may be or include a buoyant assembly of electrical wires that connect sensors and that can relay seismic data to the recording seismic vessel. As an example, a multi-streamer vessel may tow more than one streamer cable to increase the amount of data acquired in one pass. As an example, a marine seismic vessel may be about 75 m long and travel about 5 knots, for example, while towing arrays of air guns and streamers containing sensors, which may be located, for example, about a few meters below the surface of the water. A so-called tail buoy may assist crew in location an end of a streamer. As an example, an air gun may be activated periodically, such as about intervals of 25 m (e.g., about intervals of 10 seconds) where the resulting sound wave travels into the Earth, which may be reflected back by one or more rock layers to sensors on a streamer, which may then be relayed as signals (e.g., data, information, etc.) to equipment on the tow vessel.

In the example of FIG. 2, the equipment 210 may include a system such as the system 250. As shown in FIG. 2, the system 250 includes one or more information storage devices 252, one or more computers 254, one or more network interfaces 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc.

As an example, pressure data may be represented as "P" and velocity data may be represented as "Z". As an example, a hydrophone may sense pressure information and a geophone may sense velocity information. As an example, hydrophone may output signals, optionally as digital data, for example, for receipt by a system. As an example, a geophone may output signals, optionally as digital data, for example, for receipt by a system. As an example, the system 250 may receive P and Z data via one or more of the one or more network interfaces 260 and process such data, for example, via execution of instructions stored in the memory 258 by the processor 256. As an example, the system 250 may store raw and/or processed data in one or more of the one or more information storage devices 252.

Figure 3:
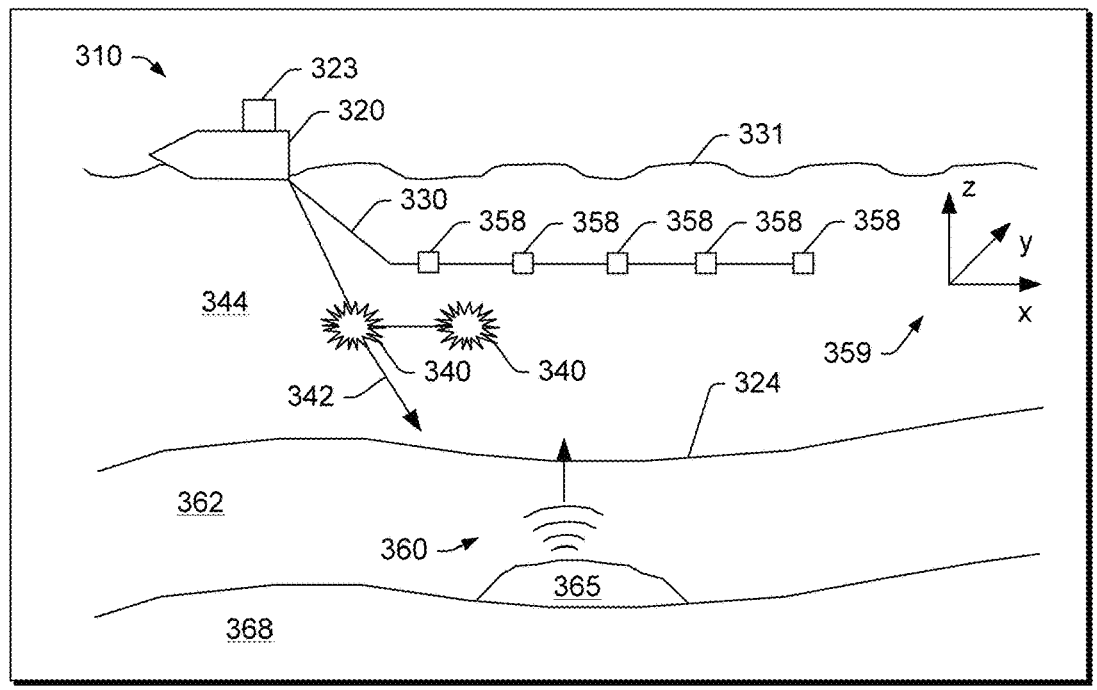
FIG. 3 illustrates an example of a geologic environment, examples of equipment and an example of a method.
Figure 3:
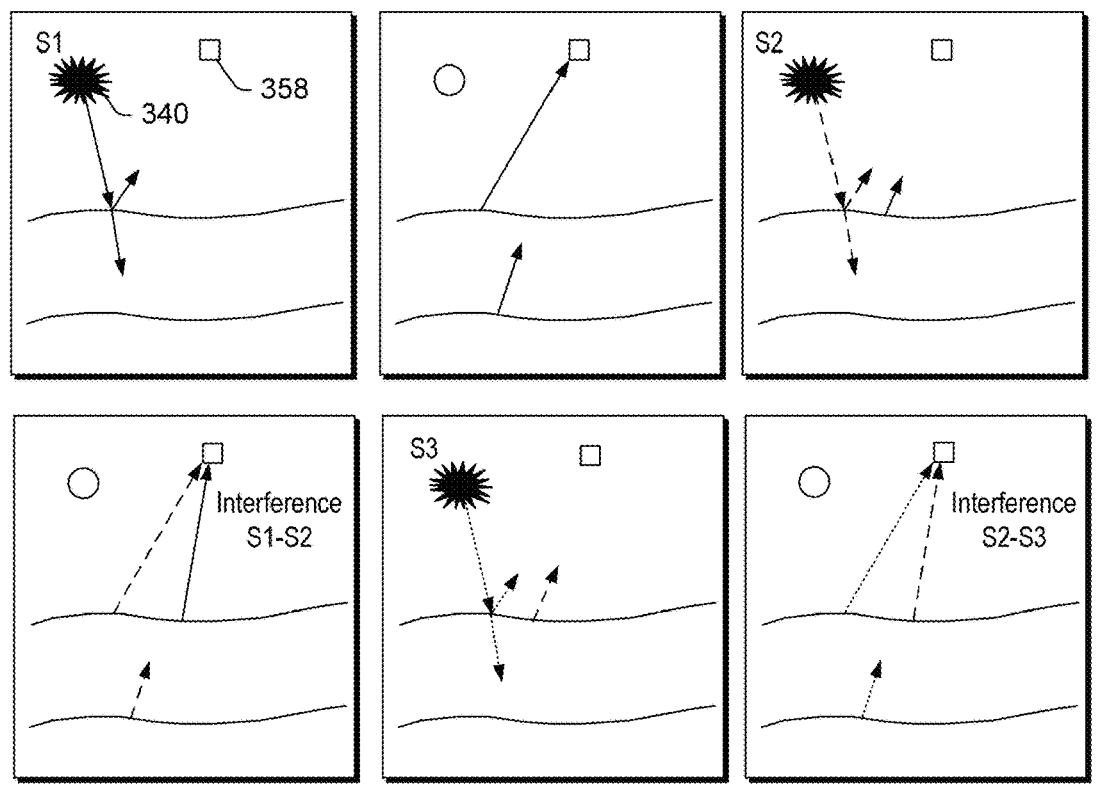

FIG. 3 illustrates a schematic diagram of an example of a marine-based seismic acquisition system 310 and an example of a method 390. In the system 310, a survey vessel 320 may tow one or more seismic streamers 330 behind the vessel 320. As an example, streamers 330 may be arranged in a spread in which multiple streamers 330 are towed in approximately a plane at a depth. As an example, streamers may be towed at multiple depths (e.g., consider an over/under configuration).

As an example, the seismic streamers 330 may be several thousand meters long and may include various support cables, as well as wiring and/or circuitry that may be used to facilitate communication along the streamers 330. As an example, an individual streamer 330 may include a primary cable where the seismic sensors 358 that can record seismic signals may be mounted. As an example, the seismic sensors 358 may include hydrophones that acquire pressure data. As another example, the seismic sensors 358 may include one or more multi-component sensors, for example, consider a sensor capable of detecting a pressure wavefield and at least one component of a particle motion that is associated with acoustic signals that are proximate to the sensor. Examples of particle motions include one or more components of a particle displacement, one or more components (e.g., inline (x), crossline (y) and vertical (z) components (see, e.g., coordinate axes 359) of a particle velocity and one or more components of a particle acceleration.

As an example, the marine-based seismic data acquisition system 310 may include one or more seismic sources 340 (e.g., air guns, etc.). As shown in the example of FIG. 3, the seismic sources 340 may be coupled to, or towed by, the survey vessel 320. As another example, the seismic sources 340 may operate independently of the survey vessel 320 in that the sources 340 may be coupled to another vessel or vessels, to a buoy or buoys, etc.

As an example, the seismic streamers 330 can be towed behind the survey vessel 320 where acoustic signals 342 (e.g., "shots") may be produced by the seismic sources 340. The acoustic signals 342 may be directed down through a water column 344 into strata 362 and 368 beneath a water bottom surface 324. As an example, at least a portion of the acoustic signals 342 may be reflected from subterranean geological formation(s), for example, consider a formation 365 as depicted in FIG. 3.

As an example, incident acoustic signals 342 generated by the sources 340 can produce corresponding reflected acoustic signals, or pressure waves 360, which may be sensed by one or more of the seismic sensors 358. As an example, pressure waves received and sensed by one or more of the seismic sensors 358 may include "up going" pressure waves that propagate to the one or more sensors 358 without reflection and, for example, "down going" pressure waves that are produced in part by reflections of the pressure waves 360 from an air-water boundary 331.

As an example, the seismic sensors 358 may generate signals, which may be traces or structured as traces (e.g., amplitude with respect to time, etc.). For example, consider traces that include information as to measurements of pressure wavefield and particle motion. As an example, signals may be recorded and may be processed by a signal processing unit 323, which may optionally be deployed on the survey vessel 320.

As an example, a method can include performing a seismic survey that acquires seismic data (e.g., traces, etc.) where such data can build an "image" of a survey area, for example, for purposes of identifying one or more subterranean geological formations (see, e.g., the formation 365). As an example, subsequent analysis of seismic data (e.g., interpretation, etc.) may reveal one or more possible locations of hydrocarbon deposits in one or more subterranean geological formations.

As an example, a particular one of the one or more seismic sources 340 may be part of an array of seismic source elements (e.g., air guns, etc.) that may be arranged in strings (e.g., gun strings, etc.) of the array. As an example, one or more sources may be fired (e.g., actuated to emit energy) according to a time schedule (e.g., a timing sequence) during a survey. As an example, a land-based seismic acquisition system may acquire data that may be processed, for example, via one or more of the methods described herein.

As mentioned, sources may be fired (e.g., actuated) according to a time schedule, a timing sequence, etc. As an example, consider a sequential source firing method that includes firing sources at intervals combined with continuous vessel travel. As another example, consider a simultaneous source firing method that include firing more than one shot at a given point in time (e.g., within a small duration of time such that analysis may consider the shots to be simultaneous). In such an example, sensors may sense information from multiple simultaneous shots and, for example, processing of the sensed information may separate the sensed information into individual source components. As an example, where simultaneous source firing is implemented, "boat time" (e.g., turnaround time, etc.) may be approximately the same or less than a sequential technique (e.g., depending on survey parameters, goals, etc.).

In FIG. 3, the method 390 includes firing a source 340 at a source firing time S1, firing the source 340 at a source firing time S2 and firing the source 340 at a source firing time S3. The method 390 also includes receiving signals at the seismic sensor 358. Such a method may result in strong deep interference. For example, where after one shot is fired from a source, a subsequent shot is fired from the source and energy associated with the subsequent shot is received at a seismic sensor over a period of time during which energy from the prior shot is also received. In such an example, a portion of energy of the prior shot interferes with acquisition of energy from the latter shot. The portion of energy from the prior shot may be referred to as late arriving energy (e.g., late data). As an example, interference may also occur in a survey where sources are fired in a relatively simultaneous manner. In such an example, some amount of interference may be expected and, for example, a purposeful part of a survey.

As to the energy associated with the source 340 at the source firing time S1, it can be partially reflected at an interface to generate a reflected upgoing portion while another portion penetrate deeper toward another interface. Thus, in the simplified illustration, two portions exist, an upgoing portion and a downgoing portion. As illustrated, at approximately a source firing time S2, an upgoing portion from the source firing time S1 and an upgoing portion from the source firing time S2 can exist. As these portions travel upwards, they can arrive at the seismic sensor 358 over a common span of time to result in S1-S2 interference. As illustrated, for the source firing time S3, there may be S2-S3 interference. Accordingly, interference can exist in data for a plurality of shots of a survey.

As an example, interference can exist in one or more types of surveys such as, for example, a land-based survey or a sea-based survey. As mentioned, interference can be more pronounced where a survey aims to acquire data for deep structures in a geologic environment.

Figure 4:
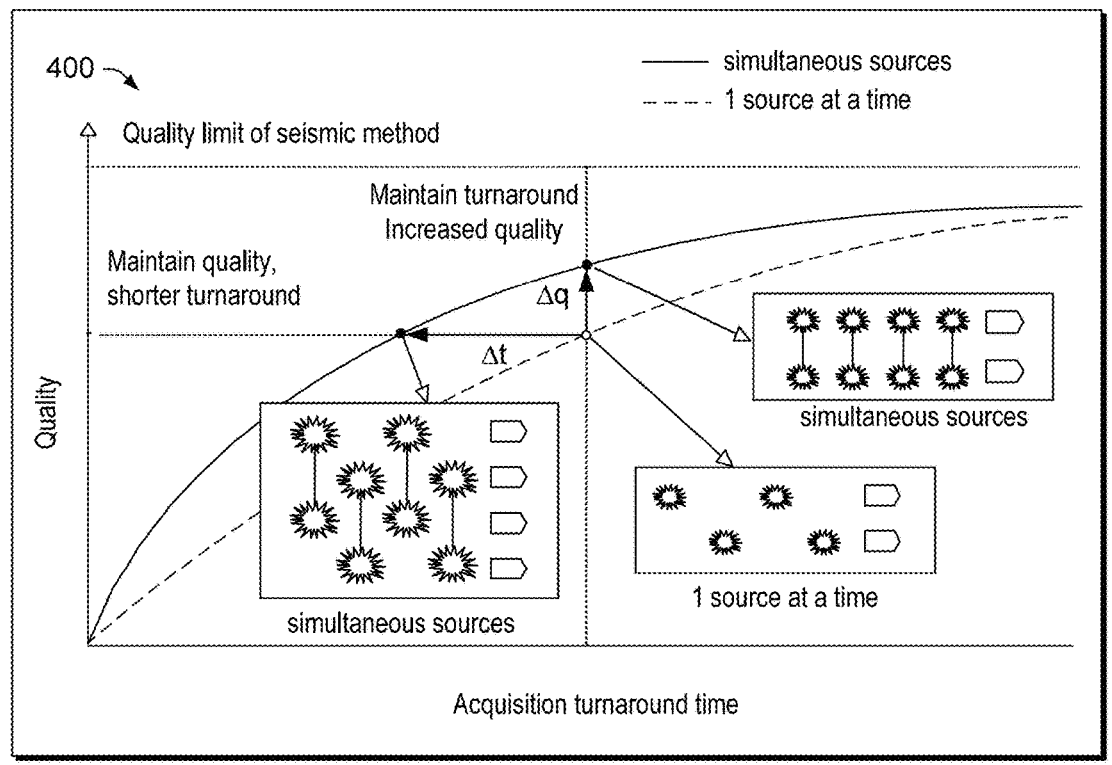
FIG. 4 illustrates an example of a geologic environment and examples of equipment.

FIG. 4 shows an example plot 400 of quality versus acquisition turnaround time. For example, consider a simultaneous seismic source acquisition and processing technique that may allow for an improvement in quality for a standard turnaround time or a reduced turnaround time that may aim to achieve a quality level of a sequential technique (e.g., which would take a longer time). In FIG. 4, a dashed curve corresponds to a single source firing at a time approach while a solid curve corresponds to a simultaneous source firing at a time approach. As illustrated, time may be shortened (see, e.g., Δt) and/or quality may be improved (see, e.g., Δq). As mentioned, interference may occur in one or more types of surveys.

Figure 5:
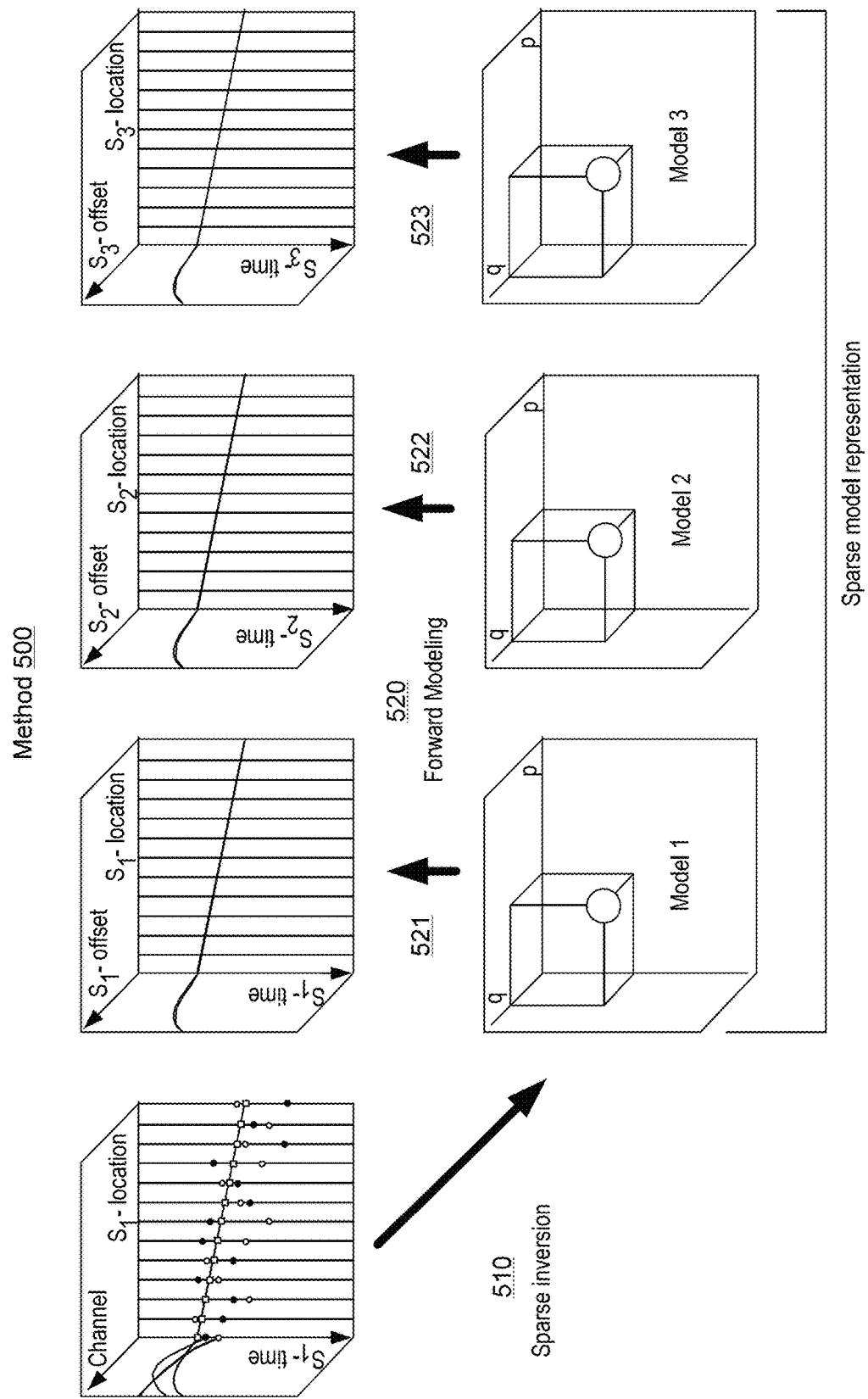
FIG. 5 illustrates an example of a method.

FIG. 5 shows an example of a method 500 that includes performing sparse inversion 510 and forward modeling 520, which can include forward modeling 521, 522 and 523 for a plurality of individual models (see, e.g., models 1, 2 and 3).

The method 500 can include receiving data for three reflections generated by three sources at different spatial positions on a number of shot records. As an example, source firing time dither patterns may be encoded in acquired signals such that the encoded dither patterns allow for differentiation between energy from individual sources, for example, per an iterative sparse inversion algorithm. In such an example, sparse models may be generated for each of the individual sources (see, e.g., sparse model representations in FIG. 5). As illustrated in FIG. 5, the method 500 can include forward modeling, which can include transforming a plurality of individual models to generate separated source components. For example, where data for three sources are received, three models may be generated and transformed to output separated components for the three sources.

As an example, a survey may employ a narrow-azimuth (NAZ) acquisition technique, a wide-azimuth (WAZ) acquisition technique, or one or more other acquisition techniques. As an example, a water-based survey may employ one or more vessels, one or more buoys, etc.

As an example, where multiple sources are fired simultaneous, so-called seismic interference can exist (see, e.g., simultaneous sources examples of FIG. 4). For example, acquired data sensed for multiple sources that are fired simultaneously can include interference (e.g., wavefield interference). In such an example, a technique that can separate components of individual sources may act to reduce (e.g., "remove") interference, which may be considered to be source-generated interference.

As mentioned, interference may also exist where energy from multiple shots in a discrete shot survey (see, e.g., the one source at a time example in FIG. 4) arrive at a seismic sensor over a common span of time.

Interference, ghosting, etc. may be considered to be sources of and/or forms of noise. As an example, interference may arise due to one or more survey parameters. For example, consider shot-to-shot interval parameter of X seconds and a record length parameter of Y seconds. In such an example, where the shot-to-shot interval parameter is less than the record length parameter (e.g., X<Y), interference may be recorded. As an example, consider a survey where X is about 12 second and where Y is about 16 seconds. In such an example, data may exhibit deep interference that is about 40 dB or more than underlying signal. As an example, a survey parameter such as a shot-to-shot interval parameter may be specified as a time and/or as a distance (e.g., consider moving equipment).

As an example, technology such as, for example, the SIMSOURCE™ technology (Schlumberger Limited, Houston, Tex.), may be implemented for simultaneous seismic source acquisition and processing. Simultaneous seismic source acquisition can acquire data that differ from single seismic source sequential acquisition data in that an individual trace can include multiple shot locations associated with it as well as, for example, dither (e.g., as encoded via one or more sources).

As explained with respect to FIG. 5, data may be provided as volumetric data (e.g., a seismic cube, etc.), for example, in the form of traces. As an example, a coordinate dimension of such data may be time or distance. For example, data may be specified using distance or time and distance. Acquired data may be considered to be in an acquisition domain (e.g., or a "shot domain") such as a spatial domain, optionally with a time axis that may be a proxy for depth (e.g., time as a proxy for distance). Where noise may exist, an attenuation method may be applied to data in the acquisition or shot domain; noting that such a method, where applied before separation, may aim to preserve information from multiple sources.

As an example, a noise attenuation method may be applied to multi-source data in an acquisition or shot domain where acquired signal from the multiple sources is coherent. As an example, in one or more other types of domains, the signal from a source of multiple sources may lack coherence and a noise attenuation may undesirably attenuate that signal.

As mentioned, a separation process may employ a sparse inversion algorithm, for example, to common channels. In such an example, sparseness may be promoted using a time-domain, linear Radon transform that effectively separates each trace into estimated components for each source, optionally also to generate a residual of unseparated energy. In such an example, the residual can include ambient noise and signal that has not been modeled (e.g., signal that may be too weak, complex, etc.). As an example, a residual may optionally be added back to separated data for one or more of multiple sources. After separation, data volume may be a multiple of number of sources (e.g., if two sources, data volume may be doubled). As an example, a separated data volume may include traces associated with a single source. In such an example, the data volume may be in a domain such as the original acquisition or shot domain.

As an example, a noise attenuation method may be applied to one or more separated data volumes. As an example, a noise attenuation method may be applied to data acquired using a sequential firing technique, data acquired using a simultaneous firing technique or data acquired using another type of technique.

As an example, a method can be applied to data of a data domain where a portion of the data in the data domain can be noisy, for example, the contribution of noise may exceed the contribution of signal such that a signal to noise ratio is less than one and, for example, may be an order or more less than one (e.g., consider a signal to noise ratio of about 0.1, or about 0.01, etc.). Processing can act to attenuate noise, which may include, for example, extracting signal and/or extracting noise (e.g., noise removal or noise attenuation). A result can be or include noise attenuated data.

As an example, a method can address a situation in which noise is stronger than an underlying signal where noise can be distinguished from the signal at least to some extent in a transform domain such as, for example, the curvelet domain or other suitable domain (e.g., τ-p domain, etc.). As an example, a method can include generating a model of underlying signal, which may be data as a model or otherwise a model based on data (e.g., processed data as a model, a parametric model where one or more parameter values are determined based at least in part on data, etc.). In such an example, the model may be an approximate model in that it is less than one hundred percent accurate (e.g., less than ninety percent accurate, etc.); however, the model is still to be approximately representative of the signal in the transform domain. Such a model may be used, for example, in a thresholding process in the transform domain to attenuate particular parts of that domain identified as noise; noting that some signal may be included (e.g., improperly identified as noise, etc.) and/or that some noise may remain (e.g., an unidentified portion of the noise may remain, etc.). As an example, where some signal is included in identified "noise", a recovery process may be implemented to recover at least a portion of the signal, which, for example, may be added back to other signal data. In such an example, a portion of signal may be output (e.g., via one or more filtering processes) and a portion of signal be recovered where the output and recovered portions can be summed or otherwise combined, for example, to produce a final result.

To help assure that the model can identify at least a portion of the noise, the model can be generated from parts of the data that are relatively uncontaminated with particular noise where such parts of the data are approximately representative of the signal lying underneath the noise. In such an example, the particular noise can be interference, for example, as explained with respect to the data acquisition method 390 as approximated in FIG. 3. As mentioned, such interference can be strong, deep interference that can result from a following shot because a time interval between shots (e.g., a shot-to-shot interval) is less than a record length (e.g., a data acquisition window). In such an example, interference (e.g., noise) may be, for example, about 10 dB, about 20 dB, about 30 dB, about 40 dB or more than the underlying signal (e.g., low signal to noise).

Figure 6:
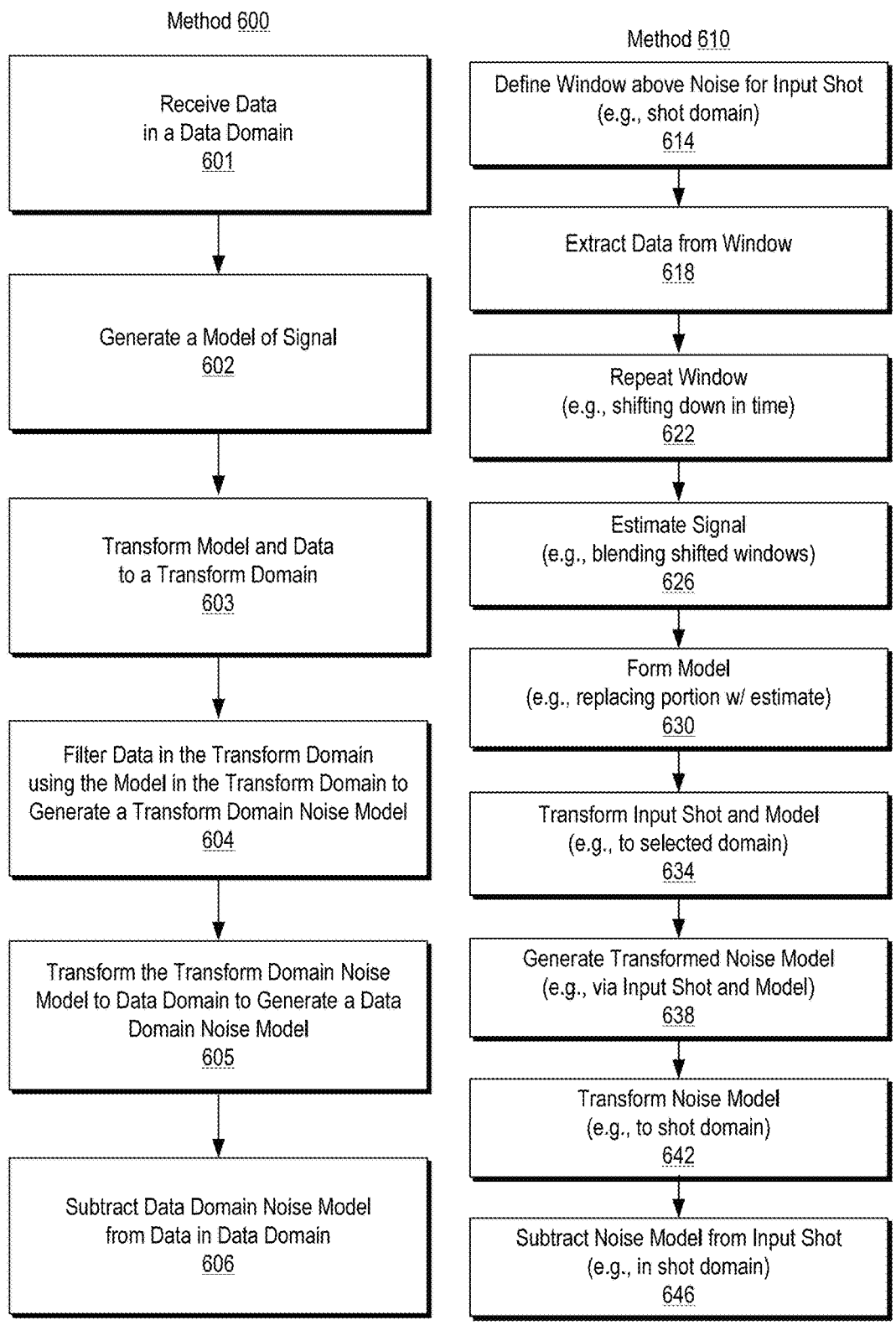
FIG. 6 illustrates examples of methods.

FIG. 6 shows an example of a method 600 and an example of a method 610. As shown in FIG. 6, the method 600 includes a reception block 601 for receiving data in a data domain where a first portion of the data domain can include a signal to noise ratio that exceeds a signal to noise ratio in a second portion of the domain; a generation block 602 for generating a model of the signal based at least in part on the first portion of the data domain; a transform block 603 for transforming the model of the signal and the data to a transform domain; a filter block 604 for filtering the data in the transform domain using the model of the signal in the transform domain to generate a transform domain noise model; a transform block 605 for transforming the transform domain noise model to the data domain to generate a data domain noise model; and a subtraction block 606 for subtracting the data domain noise model from the data in the data domain. In such an example, noise may be attenuated. For example, noise in the data received may be attenuated via the noise model as generated in the transform domain and, for example, as applied in the data domain after transform of the noise model to the data domain. As an example, the transform domain may be a curvelet domain or optionally another type of domain that differs from the data domain. As an example, the received data may be seismic data, which may be, for example, in a shot domain.

As an example, a first portion and a second portion as mentioned in the example of FIG. 6 may be differentiated at least in part data that evidences an onset of interference noise. For example, as mentioned with respect to FIG. 3, late arriving signal (e.g., energy) from a prior shot may cause interference. In such an example, as survey data can be presented with respect to time (e.g., a plot of distance and time where time may be a proxy for depth), data may increase in interference noise at a particular time such that a first portion of data may be selected to be for acquired signals that are at lesser times. As an example, a method can include selecting a first portion of data that is sufficiently deep to be more representative of deeper data that includes interference noise. For example, a near surface region may be removed from consideration from selection as a portion of a domain to form a model.

As shown in FIG. 6, the method 610 includes a definition block 614 for defining a window above noise for an input shot (e.g., in a shot domain), an extraction block 618 for extracting data from the window, a repetition block 622 for repeating the window of data and shifting down in time (e.g., to cover a time range of noise such as interference noise), an estimation block 626 for estimating signal by blending shifted windows (e.g., extracted data) to generate a signal estimate, a formation block 630 for forming a model by replacing a "contaminated" portion (e.g., or portions) of the input shot with the signal estimate, a transformation block 634 for transforming the input shot and the model to a selected domain (e.g., a curvelet domain, etc.), a generation block 638 for generating a transformed noise model by defining a threshold and zeroing parts (e.g., samples) of the transformed input shot (e.g., shot data) that are less than the threshold multiplied by the corresponding part of the model (e.g., leaving parts of the input that include noise), a transformation block 642 for transforming the transformed noise model to the shot domain (e.g., t-x domain), and a subtraction block 648 for subtracting the noise model in the shot domain from the input shot.

As an example, medium or media may be configured with instructions to allow for, at least in part, performance of various actions of the method 600 and/or the method 610. As an example, a computer-readable medium (CRM) may be a computer-readable storage medium that is non-transitory and that is not a carrier wave. As an example, one or more blocks may be in the form of a module such as, for example, one of the modules 270 of the system 250 of FIG. 2.

As an example, a method can include for each shot gather (e.g., single cable), defining a window just above the noise and extract the data from that window; repeating the window of data as desired and shifting down in time to cover the time range of noise (e.g., interference noise); blending the shifted windows and replacing the contaminated part of the shot with the signal estimate to form a model; transforming both the input shot and the model to a curvelet domain; defining a threshold, and zeroing parts (e.g., samples) of the transformed input data that are less than the threshold multiplied by the corresponding part of the model to leave the parts of the input that include the noise (e.g., hence forming a transformed noise model); and transforming the noise model back to the t-x domain, and subtracting it from the input shot.

As an example, the method 600 may be applied where noise is relatively strong compared to underlying signal and where noise can be distinguished from the signal at least to some extent in a transform domain such as, for example, a curvelet domain.

As explained above, the method 600 can involve generating a model that represents underlying signal. In such an example, the model of signal may be somewhat lacking in accuracy while still being relatively representative of the signal in the transform domain. As an example, a model of signal may be used in a thresholding process in a transform domain together with data in the transform domain where the data includes signal and noise, for example, to generate a noise model. As an example, a model of signal may be generated from parts of data that are determined to be uncontaminated with noise (e.g., particular noise that may be objectively and/or subjectively identified) and that are representative of the signal lying underneath the noise.

As an example, one or more portions of a method may be automated. As an example, a method may attenuate noise using a noise model that results from an automated thresholding technique performed in a curvelet domain. As an example, a method may include attenuating noise at least in part via thresholding performed in a transform domain (e.g., a curvelet domain). For example, a noise model may be generated in a transform domain (e.g., a curvelet domain) using one or more thresholding techniques.

As an example, a method may provide for separation of data from interfering sources. As an example, a method may include using incoherence of interference, for example, from shot to shot as a discriminating feature. As an example, a method such as the method 600 of FIG. 6 may operate without using incoherence, though such a method may be included in a workflow that may include a method that uses incoherence.

As an example, a method such as, for example, the method 600 of FIG. 6, may be applied to a SIMSOURCE™ dataset that includes strong, deep interference from a following shot because a time interval between shots (e.g., about 12 s) is less than a record length (e.g., about 16 s). In such an example, interference may be about 40 dB or more than the underlying signal.

As an example, one or more methods may optionally implement a noise criterion or noise criteria. For example, such a criterion or criteria may be used to determine whether to commence a particular process and/or to define regions (e.g., of a geologic environment) or portions of domains (e.g., data domains). As an example, a criterion may be specified as a signal to noise ratio (e.g., signal amplitude being of the order of about one one-hundredth of noise amplitude) or, for example, specified in decibels (e.g., signal being about 40 dB down compared to noise).

A method can include receiving the aforementioned dataset and, for each shot gather (single cable), defining a window just above the noise and extracting the data from that window; repeating this window of data as desired (e.g., optionally automatically according to a metric or metrics) and shifting down in time to cover the time range of the interference; blending the shifted windows and replacing the contaminated part of the shot with this signal estimate to thereby form the model of the signal; transforming both the input shot and the model of the signal to the curvelet domain; defining a threshold, and zeroing parts (samples) of the transformed input data that are less than this threshold multiplied by the corresponding part of the model of the signal to leave the parts of the input that include the noise, hence forming a transformed noise model; and transforming the noise model back to the t-x domain, and subtracting it from the input shot, for example, to generate a dataset with attenuated noise.

Figure 7:
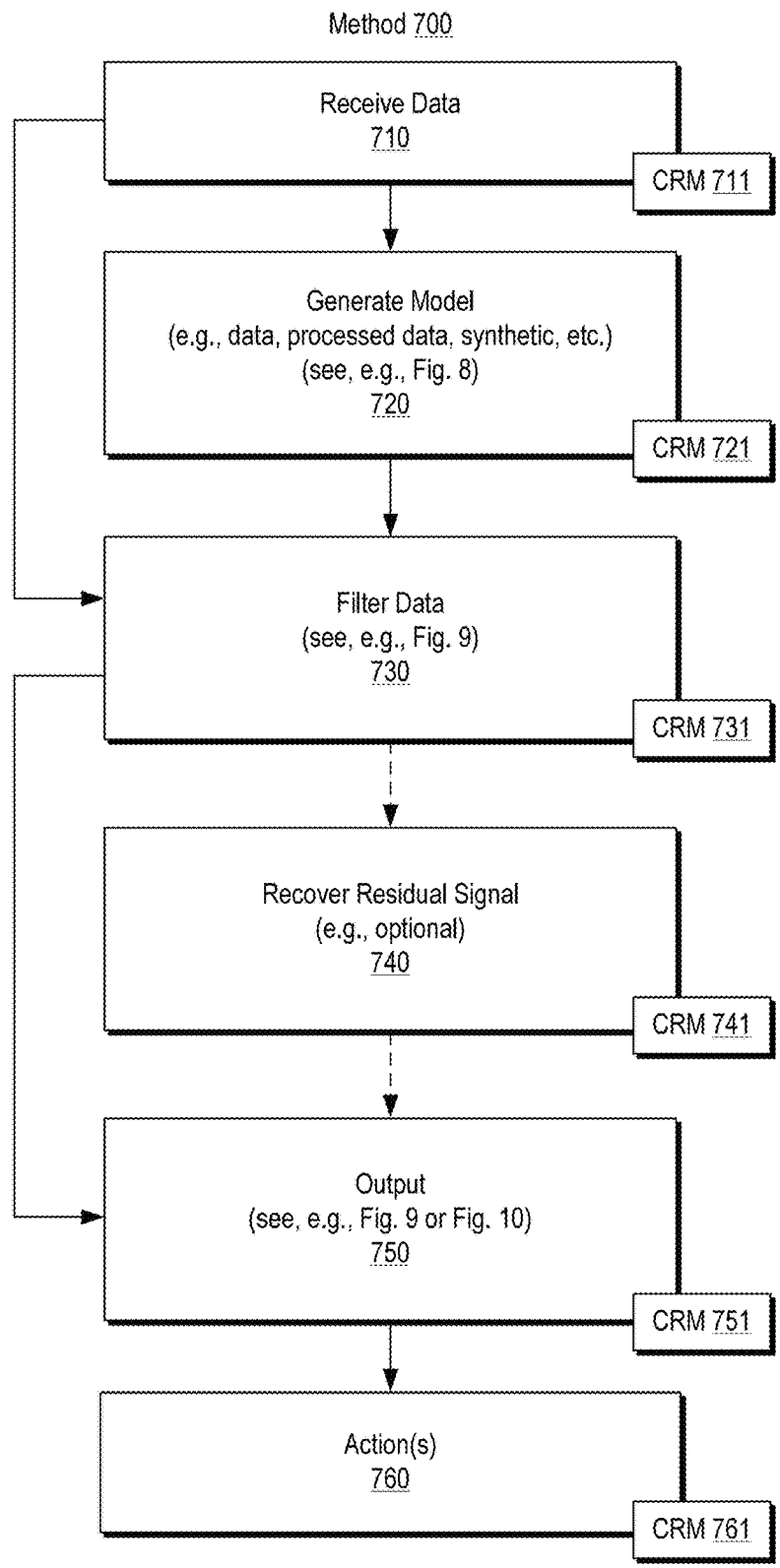
FIG. 7 illustrates an example of a method.

FIG. 7 shows an example of a method 700 that includes a reception block 710 for receiving data; a generation block 720 for generating a model (e.g., data, processed data, synthetic, etc.; optionally generating a plurality of models); a filter block 730 for filtering data in a transform domain based at least in part on the model; an optional recovery block 740 for recovering residual signal; an output block 750 for outputting information (e.g., one or more values of signals, one or more values of noise, etc.); and an action block 760 for performing at least one action based at least in part on at least a portion of the output information.

As an example, the method 700 can include, per the reception block 710, receiving data in a data domain where a first portion of the data domain includes a signal to noise ratio that exceeds a signal to noise ratio in a second portion of the data domain; per the generation block 720, generating a model; per the filter block 730, in a transform domain, based at least in part on the model, filtering at least a portion of the data in the second portion of the data domain; and, per the output block 750, based at least in part on the filtering, outputting noise attenuated data for at least a portion of the data in the second portion of the data domain.

As an example, a medium or media may be configured with instructions to allow for, at least in part, performance of one or more of the various actions of the method 700. As an example, a computer-readable medium (CRM) may be a computer-readable storage medium that is not a signal, that is non-transitory and that is not a carrier wave. As an example, one or more blocks may be in the form of a module such as, for example, one of the modules 270 of the system 250 of FIG. 2. As shown in the example of FIG. 7, blocks 711, 721, 731, 741, 751 and 761, which may be CRM blocks, modules, etc., can be utilized to at least in part perform one or more actions of the method 700. For example, the system 250 of FIG. 2 or another system (e.g., computing system, etc.) may be utilized to implement at least a portion of the method 700.

As an example, a method such as, for example, the method 500 of FIG. 5 may be performed on at least a portion of data. For example, the method 500 may be performed on at least a portion of data which may be candidate data for use in generating a model. As an example, a method such as, for example, the method 500 of FIG. 5 may be utilized as part of a model generation process.

Figure 8:
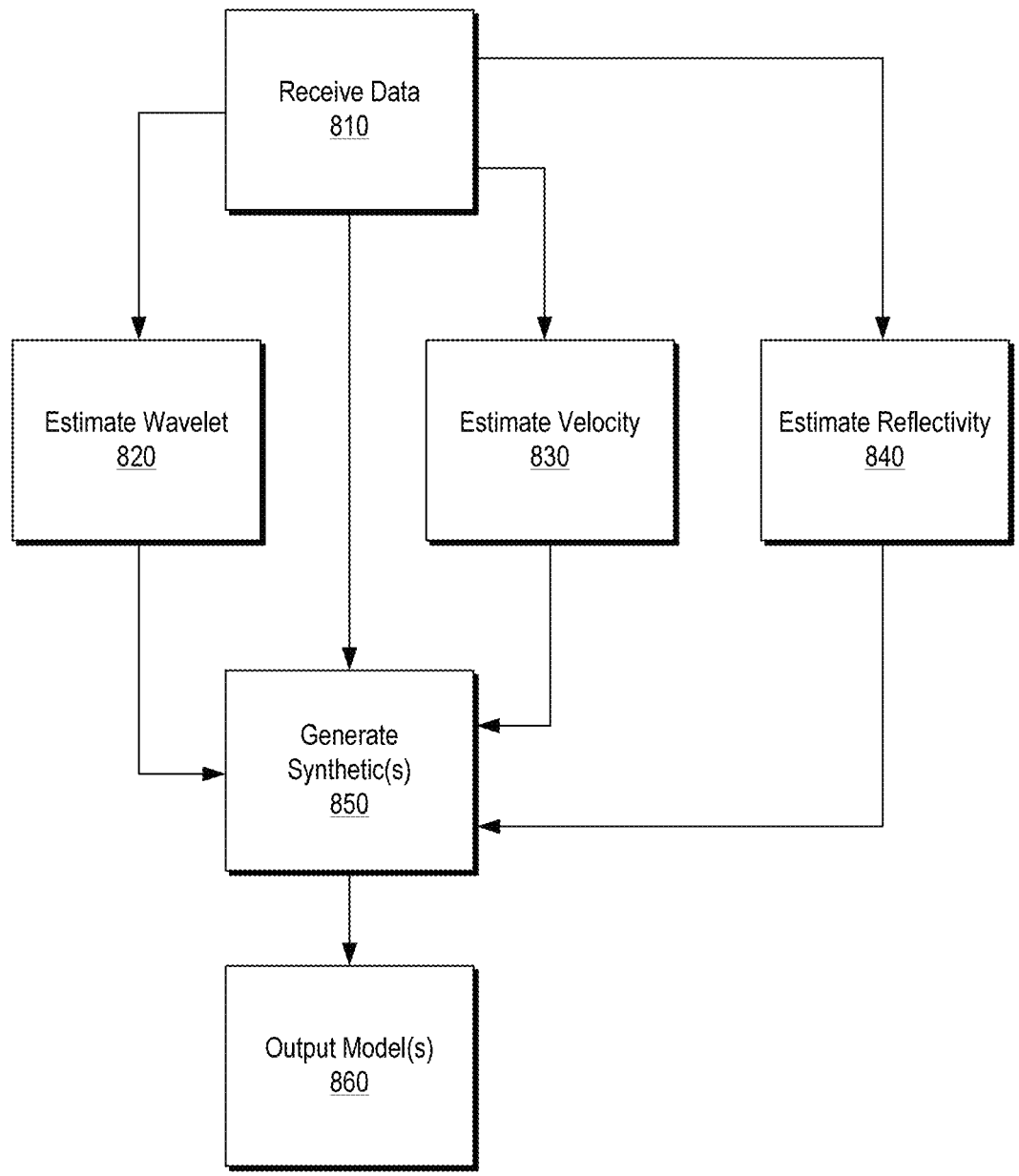
FIG. 8 illustrates an example of a method.
Figure 9:
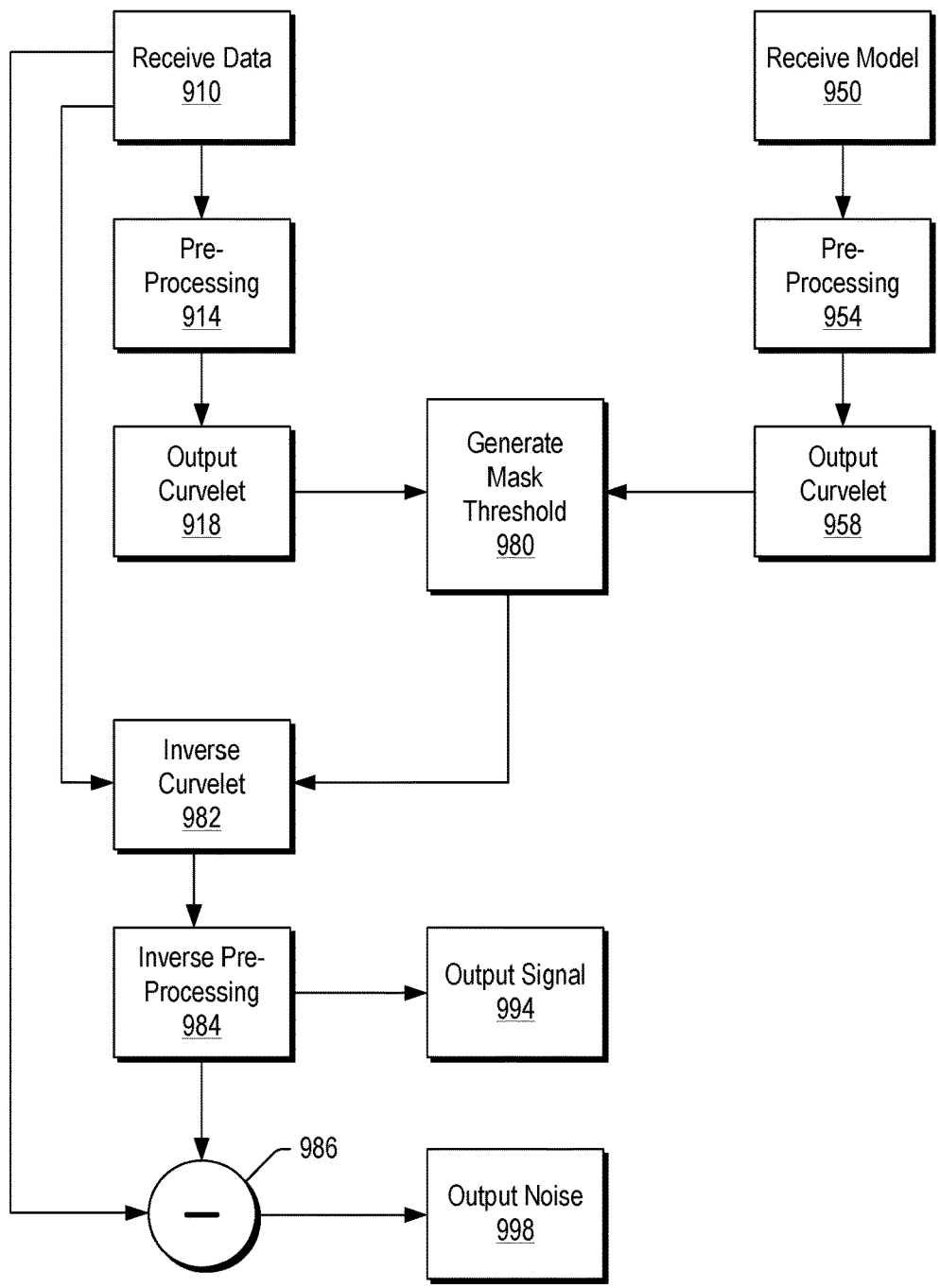
FIG. 9 illustrates an example of a method.
Figure 10:
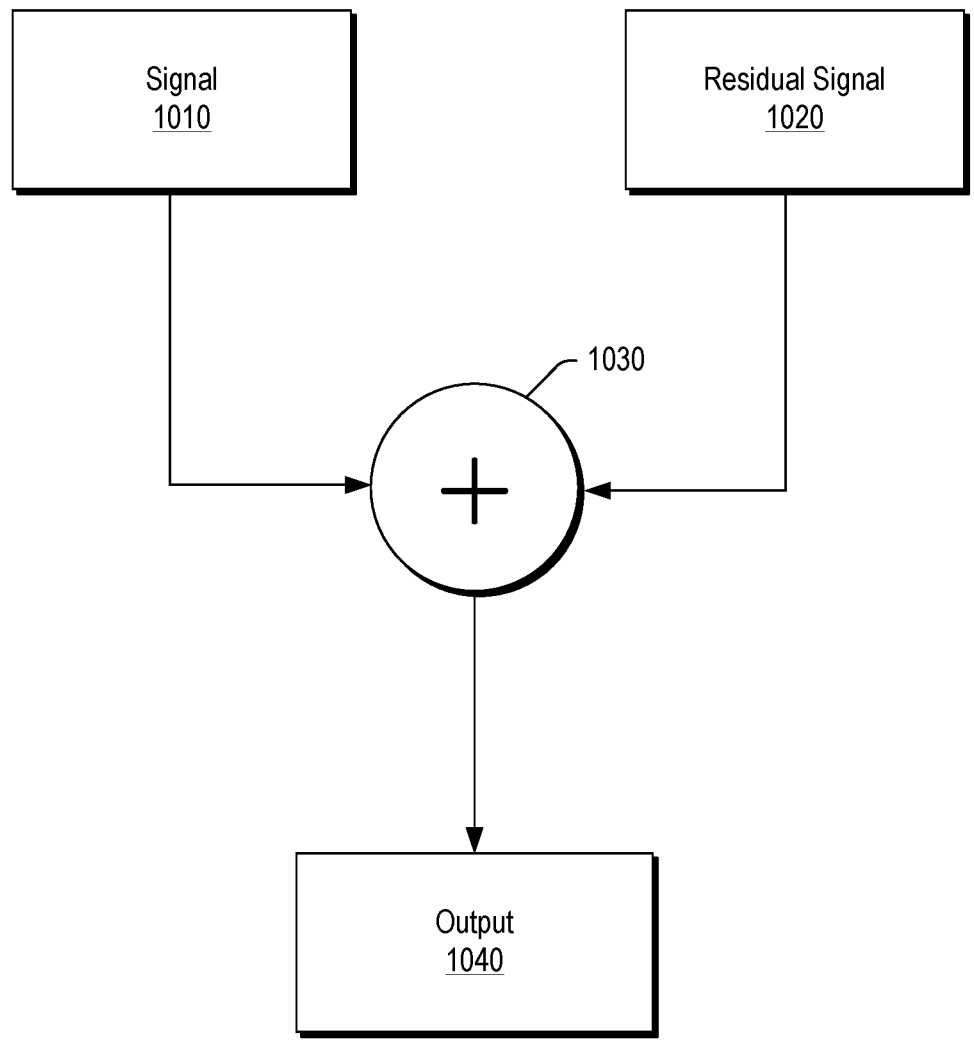
FIG. 10 illustrates an example of a method.
Figure 11:
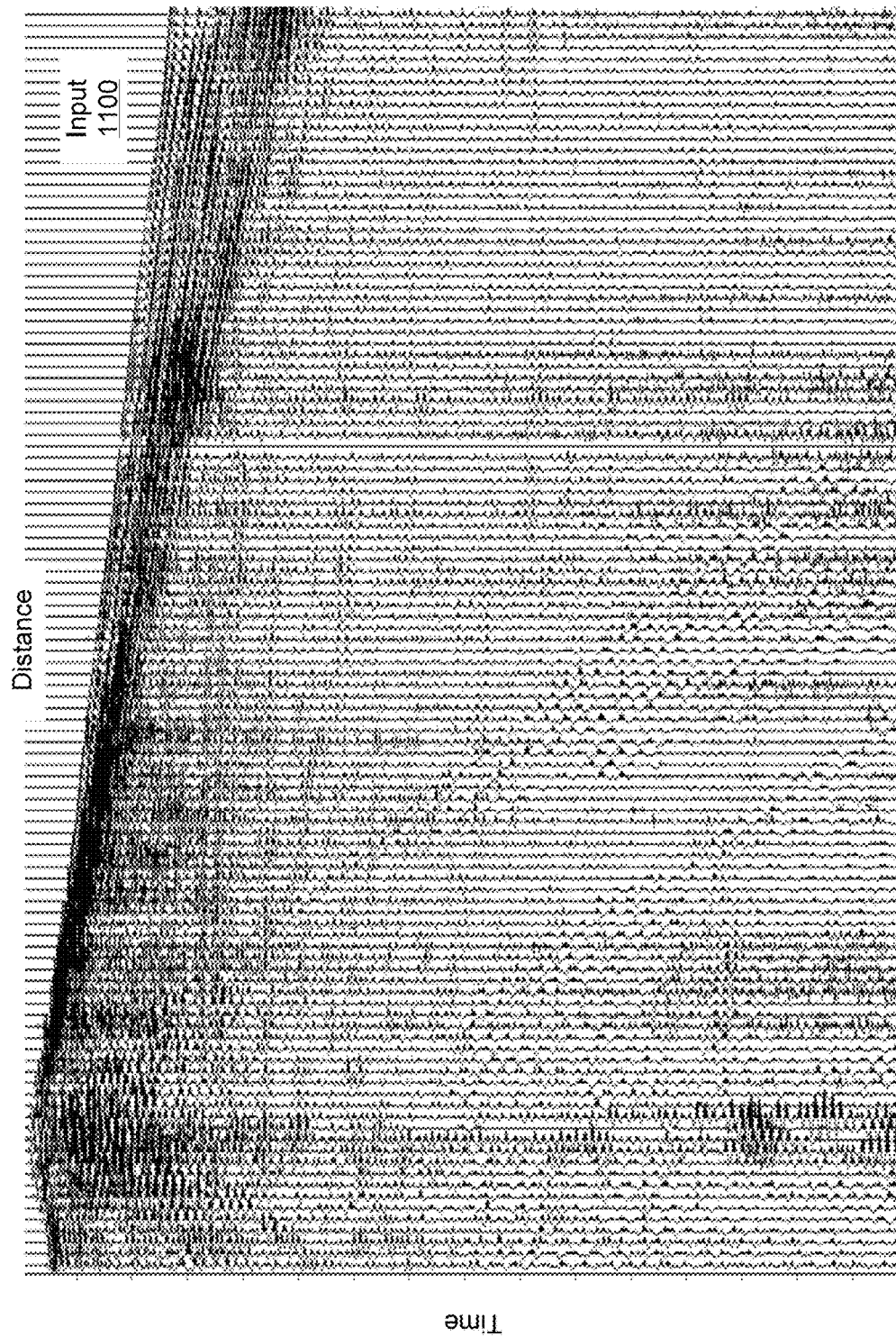
FIG. 11 illustrates an example of a plot.
Figure 12:
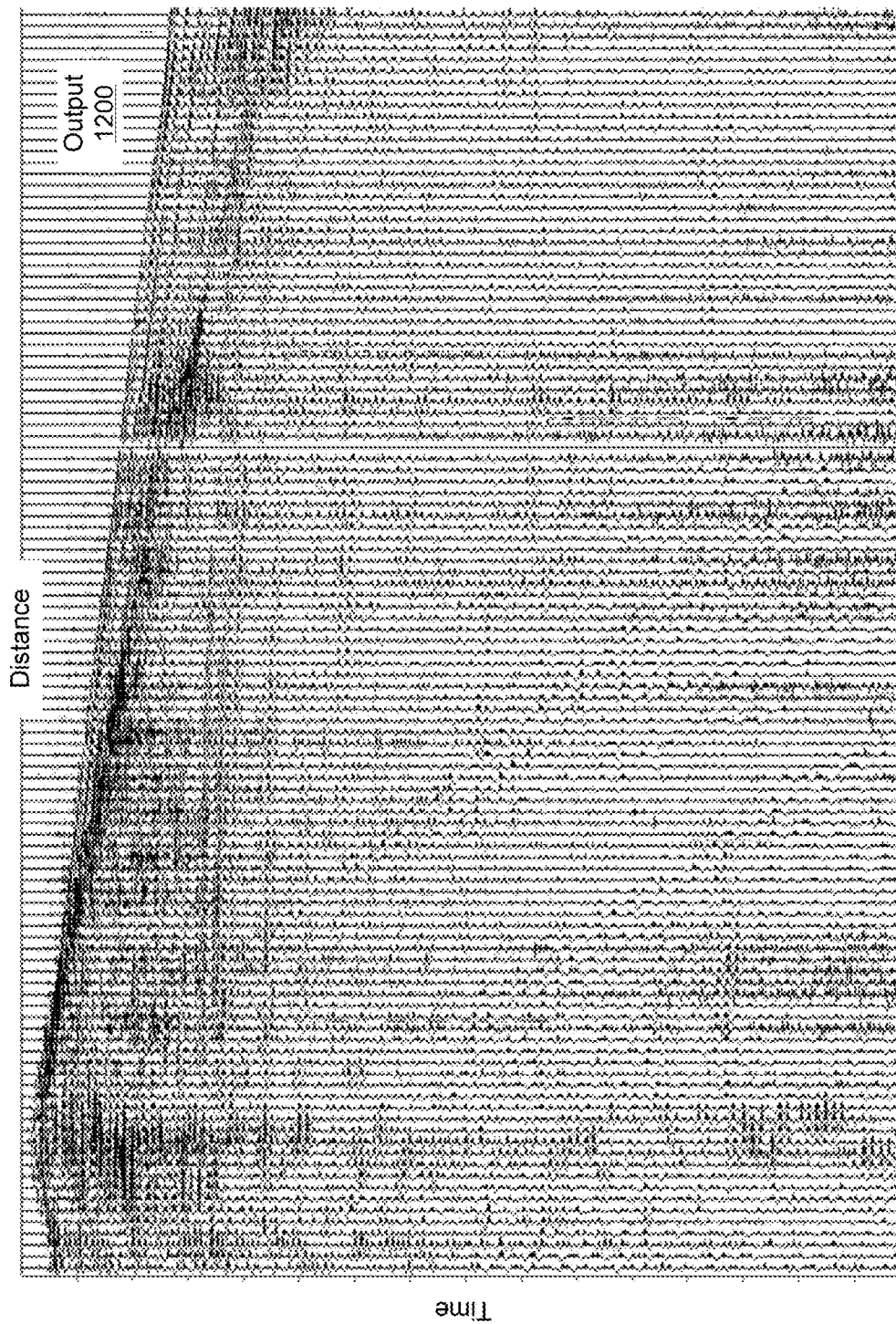
FIG. 12 illustrates an example of a plot.
Figure 13:
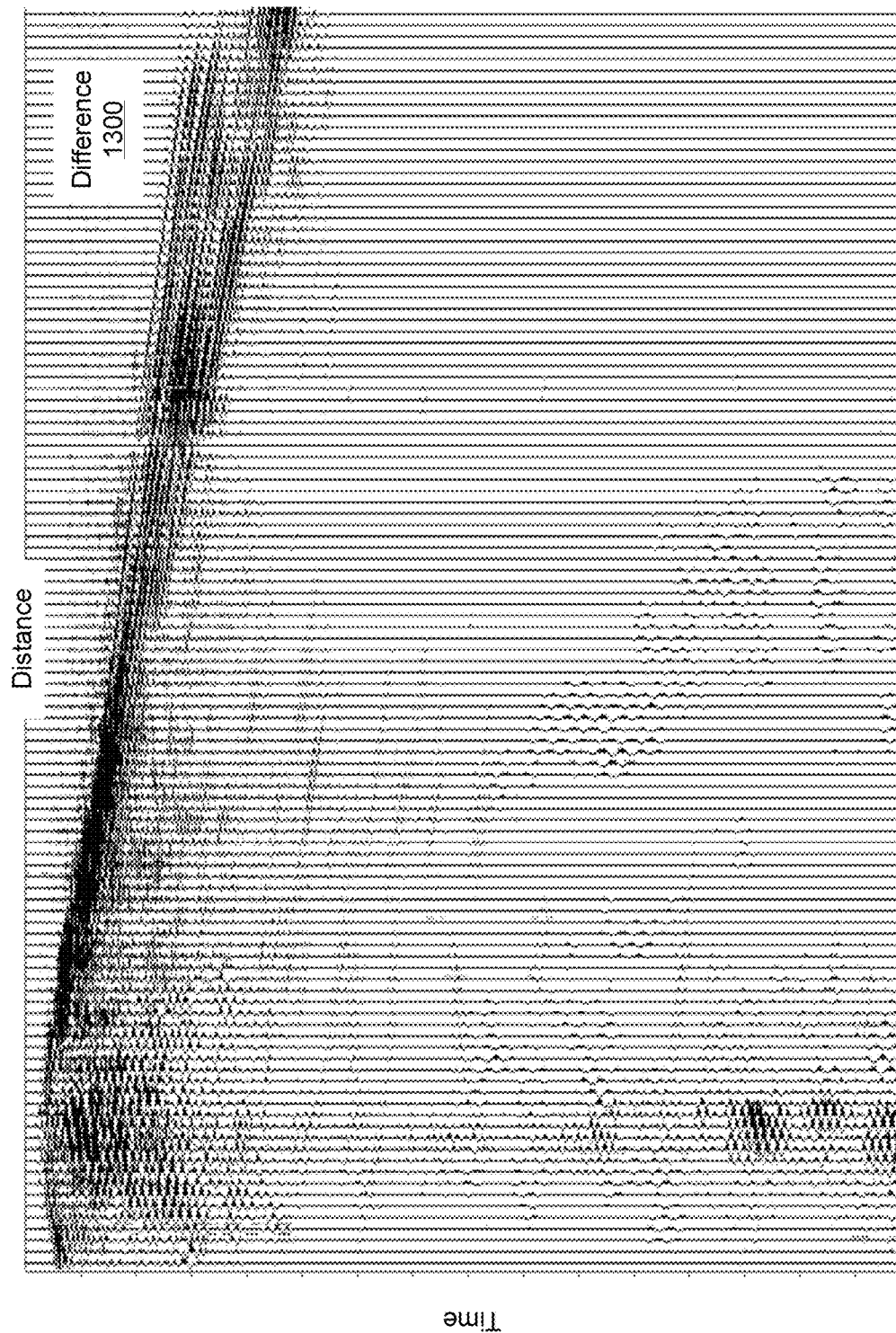
FIG. 13 illustrates an example of a plot.
Figure 14:
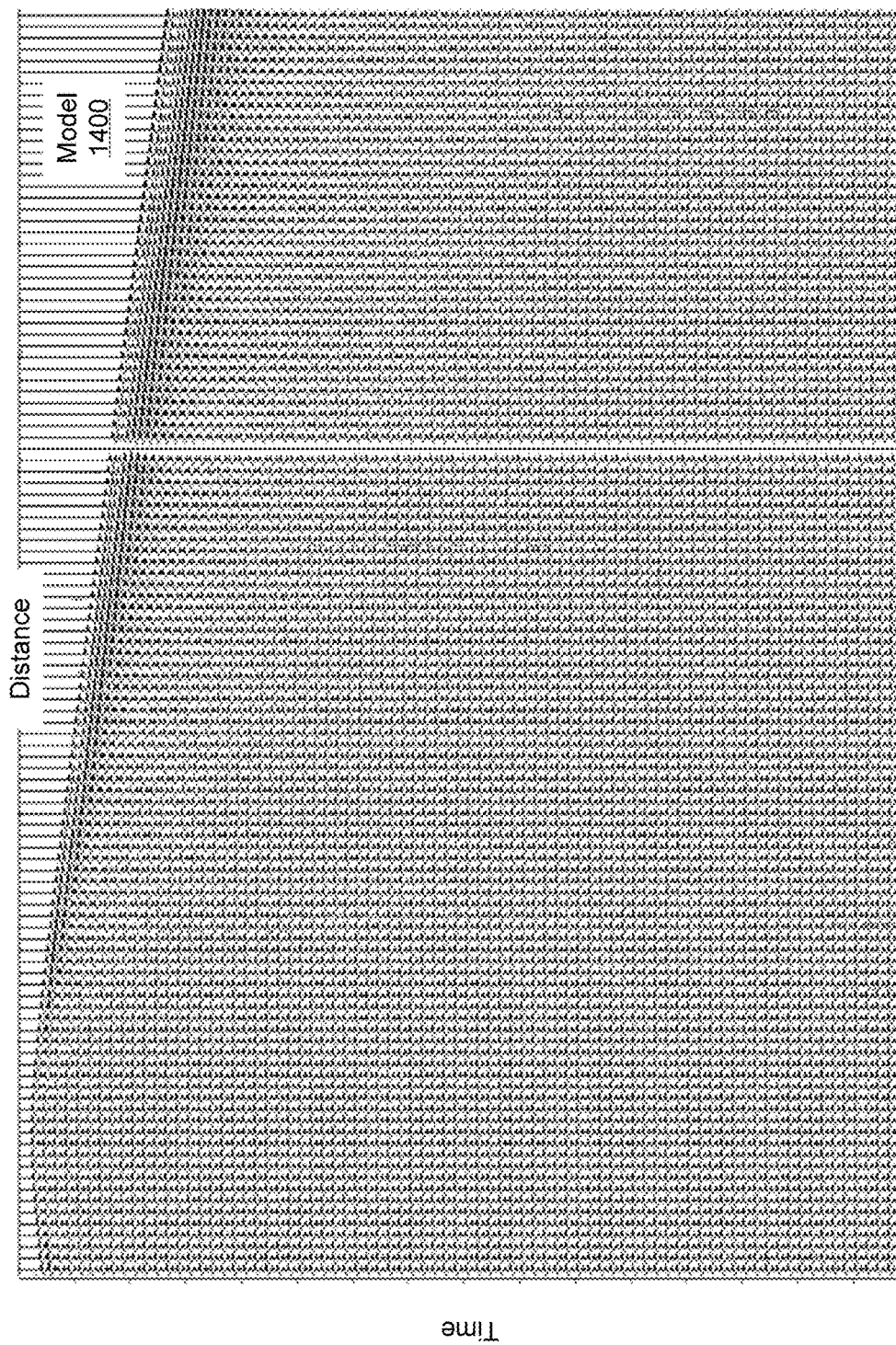
FIG. 14 illustrates an example of a plot.

In the example of FIG. 7, the generation block 720 may include at least a portion of a method such as, for example, a method 800 as illustrated in FIG. 8; the filter block 730 may include at least a portion of a method such as, for example, a method 900 as illustrated in FIG. 9; and the output block 750 may include at least a portion of a method such as, for example, a method 1000 as illustrated in FIG. 10.

FIG. 8 shows the method 800 as including a reception block 810 for receiving data, an estimation block 820 for estimating a wavelet, an estimation block 830 for estimating velocity and an estimation block 840 for estimating reflectivity. As shown, at least a portion of the data and one or more of the estimated wavelet, velocity and reflectivity can be received by a generation block 850 for generating one or more synthetics. As shown in FIG. 8, the method 800 includes an output block 860 for outputting a model or models based at least in part on the generated one or more synthetics. As an example, a synthetic may be a model (e.g., synthetic model).

As an example, a synthetic model can be based on at least a portion of received data, for example, as velocity and reflectivity can be related to data. As an example, a wavelet can be "extracted" from data. As an example, a wavelet can be based at least in part on measurements such as, for example, calibrated marine source (CMS) measurements (e.g., measurements that are data). As an example, CMS measurements can be part of a process where recorded near-field responses for individual guns in an array are used to generate an estimated wavelet (e.g., a signature) in the far field for each shot, optionally at different take-off angles. In such an example, each shot record may be deconvolved relative to an average far-field signature to provide a common vertical signature for individual shots in a survey.

As an example, the estimation block 820 may utilize a stationary wavelet. As an example, the estimation block 830 may utilize a single velocity. As an example, the estimation block 840 may utilize a constant reflectivity.

As an example, a synthetic can be a synthetic seismogram or a portion of a synthetic seismogram. As an example, a synthetic can be a one-dimensional model of acoustic energy traveling through one or more materials (e.g., layers of rock, etc.). As an example, a synthetic seismogram may be generated by convolving reflectivity (e.g., derived from digitized acoustic, density logs, etc.) with a wavelet that may be of a selected shape and at least in part defined based on an analysis of seismic data. As an example, a synthetic seismogram may be generated iteratively (e.g., using a nonlinear inversion algorithm). As an example, a wavelet may be selected and optimized to obtain a best fit between a synthetic seismogram and data. As an example, a wavelet may be approximated by a mathematical equation such as, for example, the following equation that corresponds to amplitude of a Ricker wavelet:

$$A = (1 - 2\pi^2 f^2 t^2) e^{-\pi^2 f^2 t^2}$$

where A is amplitude of the Ricker wavelet with peak frequency f at time t (e.g., a Ricker wavelet can be defined at least in part by a value of a peak frequency).

As an example, a wavelet can be a one-dimensional pulse. As an example, a wavelet can be a response from a reflector. As an example, a wavelet can be defined at least in part by one or more of amplitude, frequency and phase. As an example, a wavelet can originate as a packet of energy from a source point (e.g., seismic energy source). As an example, a wavelet can have a specific origin in time (e.g., as emitted from a seismic energy source). As an example, a wavelet can travel in a medium or media where a portion of the energy of the wavelet can be at least in part received by a sensor, for example, as a series of events distributed in time and energy. As an example, distribution of energy can be a function of velocity and density changes in the subsurface and the relative position of the source and sensor. Energy received as to a wavelet cannot exceed that which was emitted for that wavelet. Energy of a wavelet decays with time as more partitioning takes place at interfaces. Energy of a wavelet can decay due to the loss of energy as heat during propagation, which can be more extensive at high frequency. As such, wavelets tend to include less high-frequency energy relative to low frequencies at longer traveltimes. A wavelet may be characterized by its shape and/or its spectral content (e.g., consider one or more of a Ricker wavelet, an Orsmby wavelet, a Klauder wavelet, a Butterworth wavelet, etc.).

As an example, velocity can be seismic velocity. For example, velocity can be a rate at which a seismic wave travels through a medium, that is, distance divided by traveltime. As an example, seismic velocity can be determined from vertical seismic profiles, from velocity analysis of seismic data, etc. As an example, velocity can vary vertically, laterally and/or azimuthally in a medium or media. As an example, velocity tends to increase with depth in the Earth as compaction tends to reduce porosity.

As an example, reflectivity can be a reflection coefficient. As an example, reflectivity can be a ratio of amplitude of a reflected wave to an incident wave, or how much energy is reflected. As an example, reflectivity may be denoted as "R". As an example, values can be approximately −1 from water to air in that approximately 100 percent of the energy is reflected and that approximate 0 percent of the energy is transmitted. As to other values, consider R being approximately 0.5 from water to rock; and being approximately 0.2 for shale to sand. At non-normal incidence, a reflection coefficient can be defined as a ratio of amplitudes and may depend on one or more other parameters such as, for example, one or more shear velocities. As an example, reflectivity may be described as a function of incident angle by the Zoeppritz equations.

FIG. 9 shows the method 900 as including a reception block 910 for receiving data, a pre-processing block 914 for pre-processing at least a portion of the data, and an output block 918 for outputting a curvelet. The method 900 also includes a reception block 950 for receiving a model, a pre-processing block 954 for pre-processing the model and an output block 958 for outputting a curvelet. As illustrated in the example of FIG. 9, the method 900 includes a generation block 980 for generating a mask threshold based at least in part from output of the output block 918 and based at least in part on output from the output block 958. For example, the mask threshold can be determined based at least in part on data and based at least in part on one or more models.

In the example of FIG. 9, the method 900 includes an inverse curvelet block 982 for generating an inverse curvelet based at least in part on at least a portion of the received data of the reception block 910 and based at least in part on the generated mask threshold of the generation block 980. As shown, the method 900 includes an inverse pre-processing block 984 for pre-processing the inverse curvelet. As shown, the method 900 can include an output block 994 that outputs a signal based at least in part on the inverse pre-processing block 984.

In the example of FIG. 9, the method 900 may optionally terminate at the output block 994 that outputs the signal; noting that the inverse curvelet block 982 receives at least a portion of the received data of the reception block 910. As shown, the output signal can be based at least in part on a generated mask threshold (e.g., by applying a generated mask that includes a threshold).

Referring again to the method 700 of FIG. 7, the recovery block 740 is shown as being optional. For the recovery of residual signal, the method 900 can continue, for example, to a junction block 986. For example, the junction block 986 can receive information pertaining to the pre-processed inverse curvelet of the inverse pre-processing block 984 and receive at least a portion of the received data. As shown, the method 900 includes an output block 998 for outputting noise information. For example, the junction block 986 can perform further filtering that acts to extract noise from at least a portion of the received data. Such output may be utilized for recovery of residual signal, for example, per the recovery block 740 of FIG. 7. As an example, the junction block 986 (e.g., or one or more other blocks) may perform adaptive subtraction to generate output.

FIG. 10 shows an example of a method 1000 that includes a reception block 1010 for receiving signal information and a reception block 1020 for receiving residual signal information. As shown, the method 1000 includes a junction block 1030 (e.g., a summation block, etc.) for combining at least a portion of the received signal information and at least a portion of the received residual signal information (e.g., as may be recovered from noise such as the noise information output in the output block 998 of FIG. 9. The method 1000 includes an output block 1040 for outputting signal information (e.g., enhanced signal information) where the signal information includes residual signal information, for example, as extracted from noise information that may have been somewhat aggressive or somewhat inaccurate due at least in part to a selected model (or models) and/or portion or portions of data utilized to generate a model (or models).

As an example, received data for a space can include one or more regions within the space where noise is stronger than signal. In such an example, noise can include interference, for example, associated with a "foreign" signal (e.g., consider a signal from a prior fired shot, etc.). As an example, a method can include performing a transform that acts to separate signal and noise to some extent. As an example, a curvelet transform may be utilized and/or one or more other types of transforms. As an example, a noise model may be generated and, for example, may be processed to remove residual signal from a noise model. In such an example, the residual signal can be utilized for one or more procedures that can enhance signal with respect to noise. For example, enhanced signal information may include signal information that is combined with residual signal information that is extracted from a noise model (e.g., noise information).

In the example of FIG. 9, the reception block 950 can receive a model that is a model capable of modeling at least in part an underlying signal in data. Such a model can be of a desired accuracy, for example, depending on one or more factors (e.g., amount of signal, amount of noise, amount of time, amount of resources available to perform calculations, etc.). As an example, a model can be to some amount of accuracy representative of an underlying signal in data within a transform domain. As shown in FIG. 9, the received model (e.g., or models) of the reception block 950 can be utilized in a thresholding process, for example, to generate the mask threshold per the generation block 980. As an example, a thresholding process can operate in a transform domain to attenuate parts of information in that domain identified as noise. As an example, a model or models can be generated from one or more portions of data for a space that are deemed to be of higher signal to noise than other portions. For example, a model or models may be generated from one or more portions of data that are relatively free from contamination by noise such that the one or more portions are deemed to be relatively representative of the signal lying underneath the noise.

As mentioned where noise is or includes interference noise associated with prior shots reflecting from one or more deep structures, a portion of data may be associated with a region of a geologic environment that is at a depth that is lesser than the depth of the one or more deep structures. As mentioned, such interference noise can be signal, for example, a so-called "foreign" signal that is late arriving signal from a prior shot.

As an example, a method may employ one or more techniques as additional techniques to address incoherent noise. For example, a method can include processing data to reduce incoherent noise prior to performing a method such as the method 700 of FIG. 7 and/or after performing a method such as the method 700 of FIG. 7. As an example, a technique to reduce incoherent noise may be applied to a noise model (e.g., noise information), for example, prior to recover of residual signal from the noise model (e.g., noise information).

As an example, a model can be generated via one or more techniques. As an example, a model can be generated based at least in part on one or more types of information. For example, consider knowledge of one or more of likely signal dips and velocities at depth.

FIGS. 11, 12, 13 and 14 show plots 1100, 1200, 1300 and 1400, which correspond to input data (plot 1100), output data (plot 1200), difference data (plot 1300) and model data (plot 1400). The plots 1100, 1200, 1300 and 1400 present information with respect to time and distance, where time can correspond to depth in a geologic environment and where distance corresponds to positions of equipment utilized in a survey.

As shown in the plots 1100, 1200, 1300 and 1400, a model (plot 1400) can be utilized to generate output (plot 1200) from given input (plot 1100) where a difference between the input and output appears in the plot 1300. The difference in the plot 1300 represents noise (e.g., interference noise) that is extracted from the input (plot 1100) to generate the output (plot 1200). In other words, a method can include filtering to reduce noise such as, for example, interference noise, in data such that various features may be more readily identified in the data (e.g., signals corresponding to various features desired to be identified).

As an example, a workflow can include receiving data, filtering at least a portion of the data to generate output and interpreting at least a portion of the output. In such an example, where the data include seismic data, the interpreting can include seismic interpretation, for example, as may be part of a workflow that utilized a seismic-to-simulation framework such as, for example, the PETREL® framework. As an example, the method 700 of FIG. 7 may be implemented as a module or modules of a framework such as, for example, the PETREL® framework and/or the OCEAN® framework. As an example, the method 700 of FIG. 7 or a portion thereof may be implemented as one or more of an integral portion of a framework, a plug-in to a framework, a remote application operatively coupled to a framework, etc.

FIGS. 15, 16, 17 and 18 show, respectively, input data 1500 (e.g., data of the aforementioned SIMSOURCE™ dataset), output 1600, a model of signal 1700, and the difference in the shot domain 1800 (e.g., the noise that may be attenuated).

Figure 15:
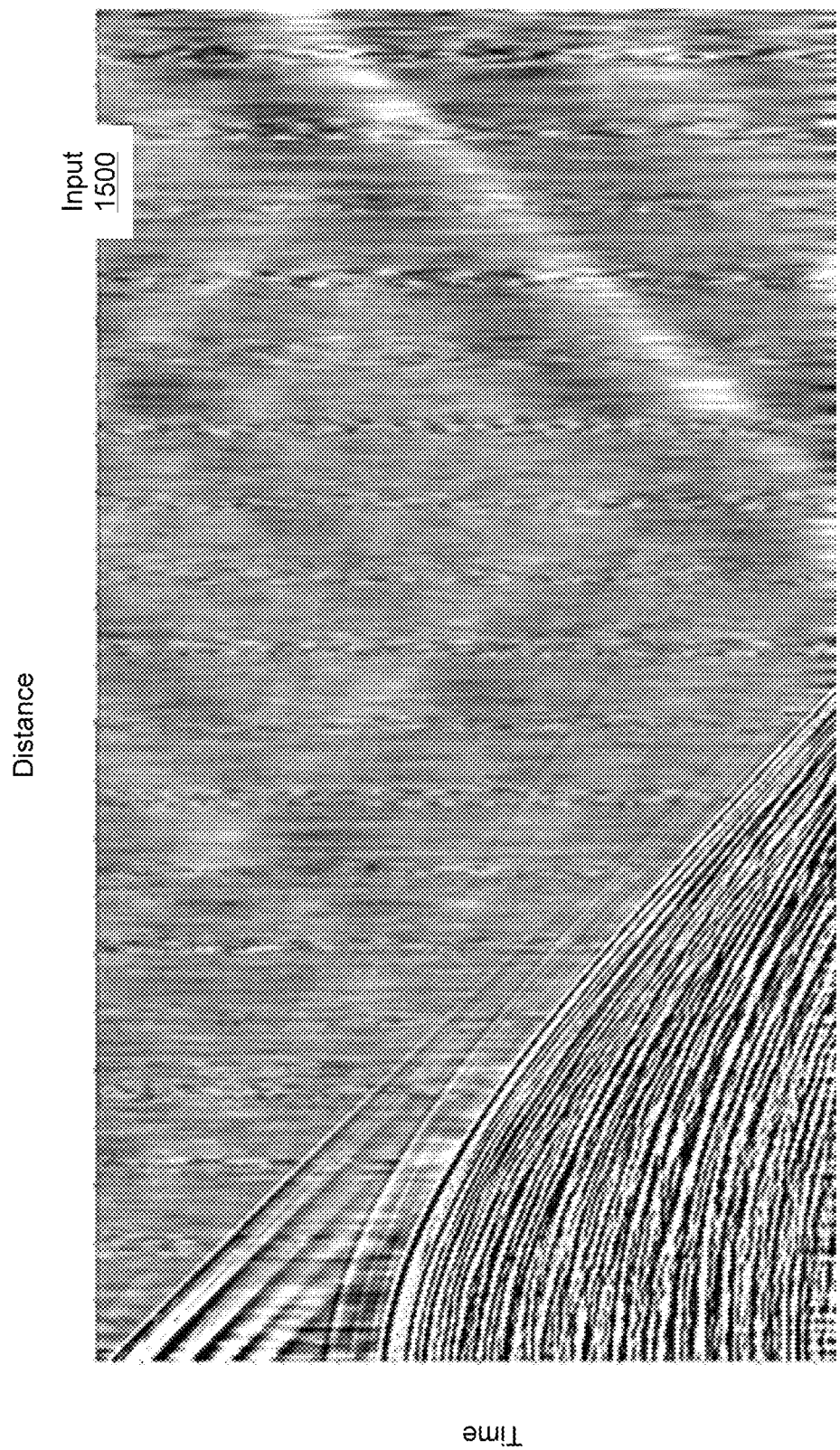
FIG. 15 illustrates an example of a plot.

FIG. 15 shows the input data 1500, an input shot gather, at the level of the interference (e.g., a portion of data in a data domain). In FIG. 15, signal that is present is not readily ascertainable to the eye, for example, because it tends to be weaker than the noise (e.g., interference noise). As an example, the input data 1500 may be processed, optionally automatically, to determine signal to noise ratio for various portions of the input data 1500. For example, consider a stencil that may be applied to determine signal to noise ratio for portions of the input data 1500 in the data domain. In such an example, a portion of the data may exhibit a greater signal to noise ratio than one or more other portions. In such an example, the portion with a greater to signal to noise ratio may be used to generate a model that represents signal (e.g., a model of signal).

Figure 16:
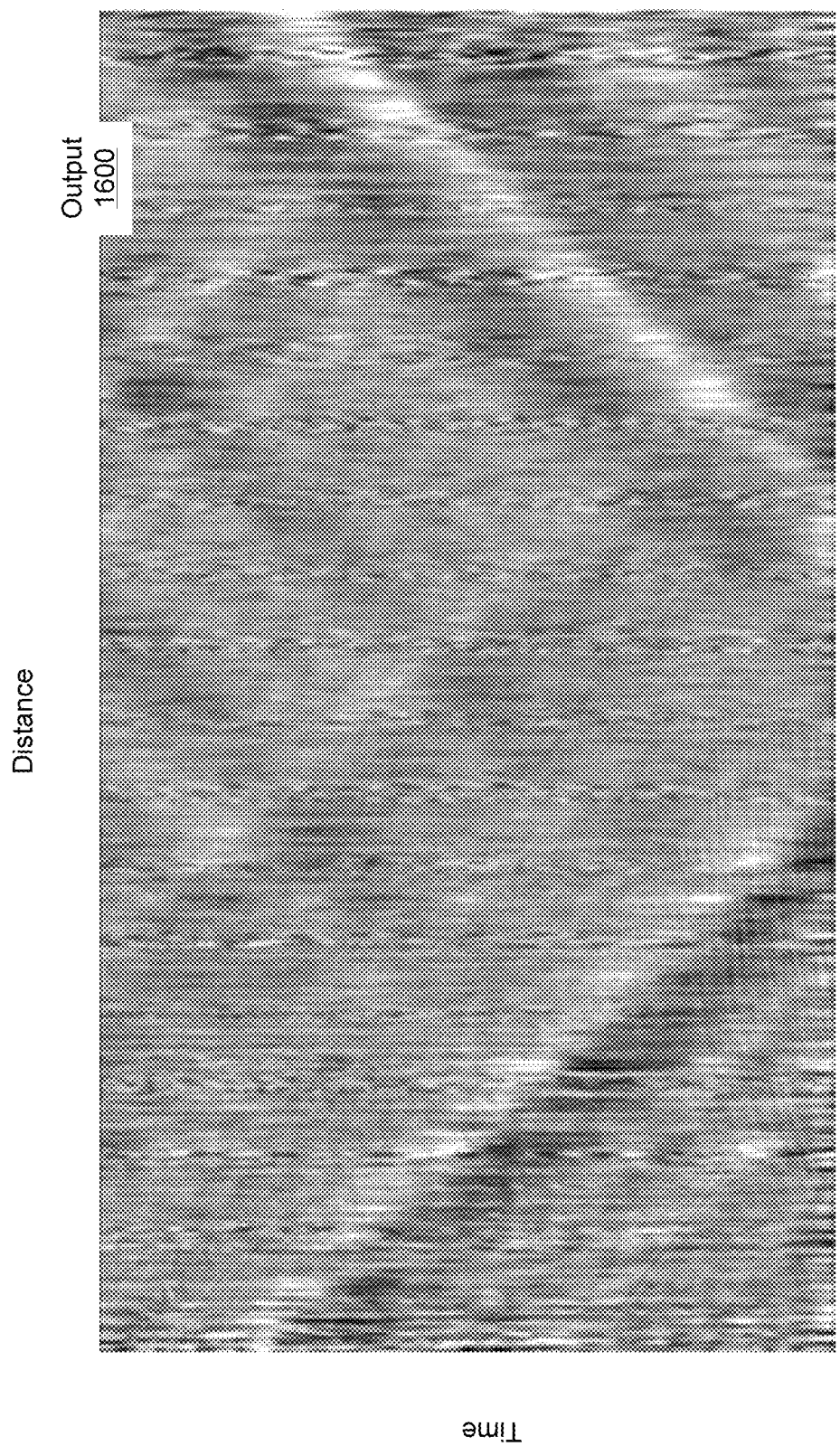
FIG. 16 illustrates an example of a plot.
Figure 17:
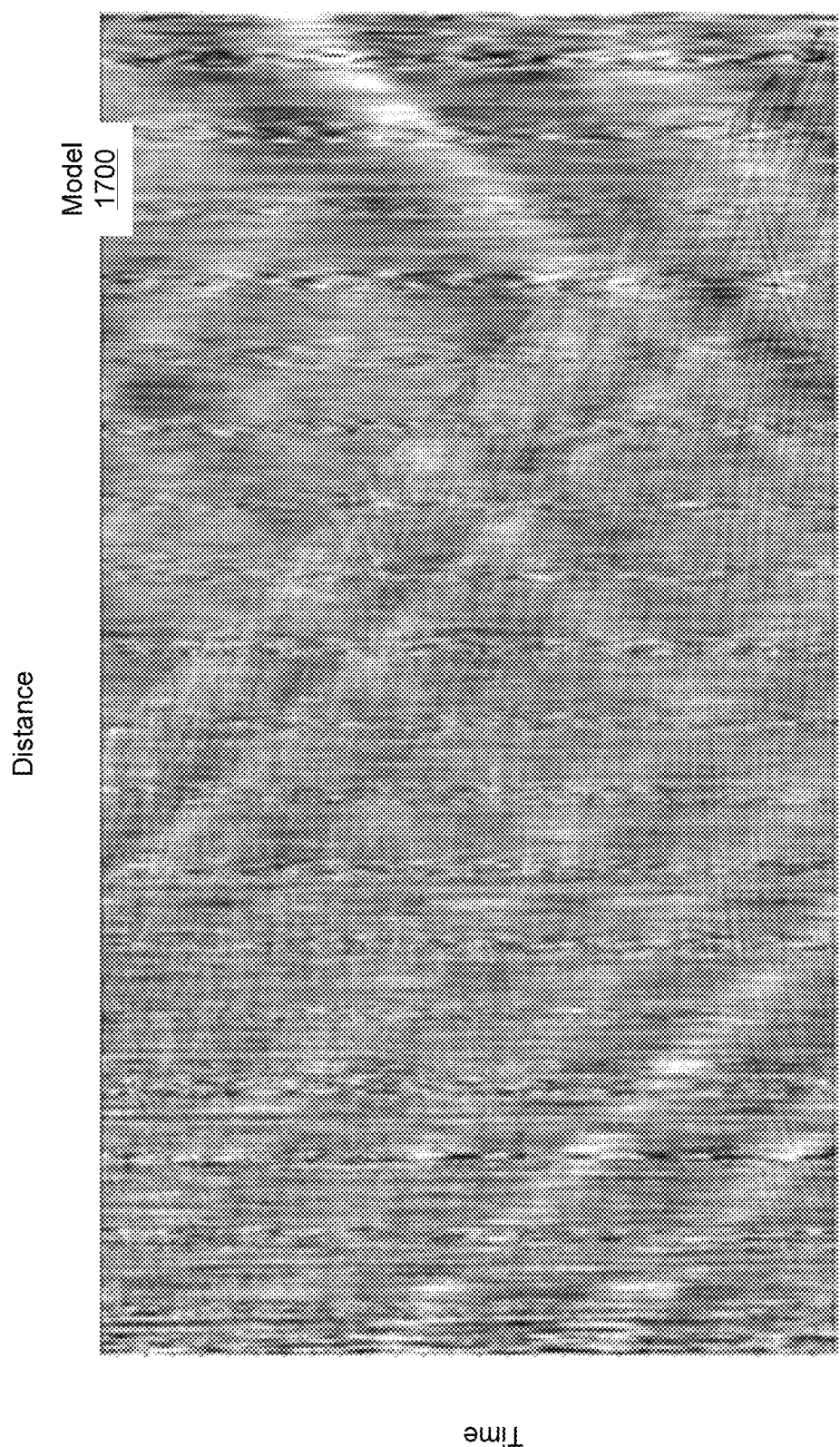
FIG. 17 illustrates an example of a plot.
Figure 18:
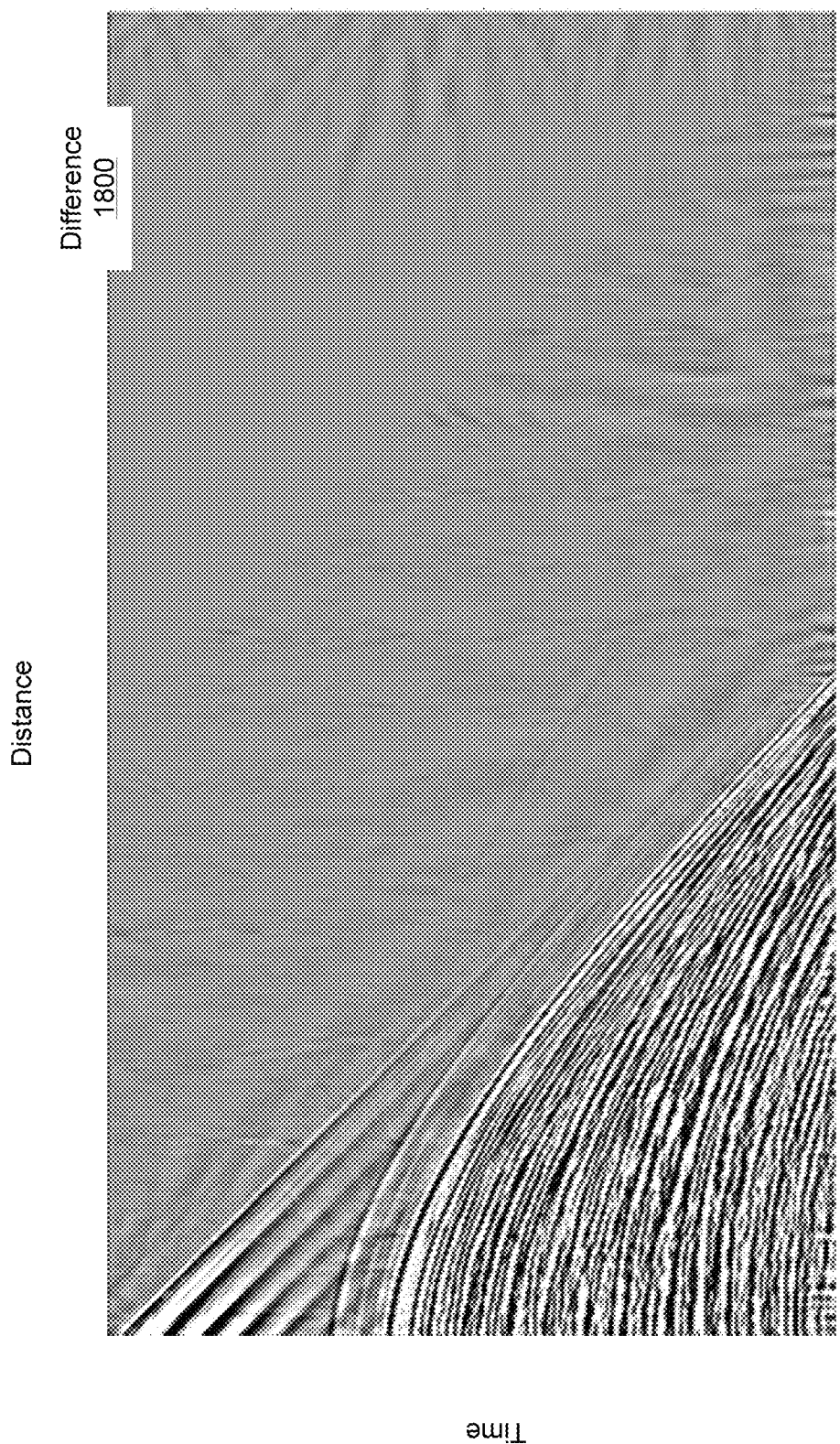
FIG. 18 illustrates an example of a plot.

FIG. 16 shows the output 1600 (e.g., an output shot gather). FIG. 17 shows the model 1700 (e.g., model shot gather), noting that this has similar character to the output (e.g., to the actual signal), however, various details may differ. FIG. 18 shows the difference 1800, which is the difference between the input and output shot gathers, which illustrates the noise that has been attenuated (e.g., consider the noise model).

As shown in FIGS. 15, 16, 17 and 18, interference, as a form of noise, may be attenuated where there can be potential for signal in remaining data. As an example, a method may be performed to characterize signal-preserving properties. For example, a method may be performed with introduction of relatively weak reference signals added to input data. In such an example, these signals may be preserved where they are separated from interference in a curvelet domain. Such an approach may be used to tailor one or more parameters, processes, etc. of a noise attenuation method. As an example, a method may aim to preserve sufficient signal to generate a deep image.

As an example, a method such as, for example, the method 600 of FIG. 6 and/or the method 700 of FIG. 7, can operate without an "accurate" signal model (e.g., with an estimated signal model). As an example, a method such as, for example, the method 600 of FIG. 6 and/or the method 700 of FIG. 7, may be implemented, at least in part, as an automated (e.g., data-driven) filter (e.g., a noise model-based filter to attenuate noise). In such an example, the filter may perform a minimum level of filtering to remove interference (e.g., to attenuate interference to an appropriated level).

As an example, a method may be applied to data such as, for example, seismic data and/or other data. As an example, a noise attenuation method may be applied to data where noise is stronger than signal and where a transform exists that can separate the signal and the noise to some extent. While various examples mention curvelets and/or a curvelet transform, one or more other types of transforms may be implemented for noise attenuation. As an example, a noise attenuation method may include processing a noise model before subtraction, for example, to remove residual signal from it. As an example, a model may be generated by one or more techniques. As an example, a model may be generated in a manner that incorporates prior knowledge of likely signal dips and velocities at depth (e.g., where the model pertains to seismic data).

As an example, a transform may be performed as a three-dimensional transform. For example, consider a method that includes performing a transform in three-dimensions for multiple shots (e.g., together), noting that some types of noise, such as interference, may not be coherent from shot to shot, for example, because of variations in shot time interval. As an example, a method may include making noise "coherent", for example, by applying appropriate time shifts. In such an example, signal may then not be coherent, however, for weak signal, it may not present issues because it will be spread out in the transform domain, so some parts of it will survive the thresholding process and contribute to the image.

As an example, one or more techniques may be applied to data to reduce noise (e.g., to attenuate noise, etc.).

As an example, noise may be characterized via one or more metrics such as, for example, a signal to noise ratio. As an example, noise may be "strong" compared to an underlying signal or signals. As an example, data may include noise that is coherent and/or may include noise that is incoherent.

As an example, a noise attenuation method may use incoherence, for example, consider incoherence of interference from shot to shot as a discriminating feature. As an example, a noise attenuation method may employ a technique that does not include use incoherence. As an example, a noise attenuation method may employ a plurality of techniques, which may include, for example, incoherence-based and/or non-incoherence-based techniques.

As mentioned, one or more curvelet techniques may be implemented. For example, consider representing information in a curvelet domain. As an example, information may be processed via a curvelet transform. For example, a curvelet transform may be viewed as a computational tool that can be implemented in a multiscale manner. A curvelet transform can be a multiscale transform with strong directional character in which elements may be relatively anisotropic at fine scales, with effective support, for example, shaped according to the parabolic scaling principle length squared approximate to width. As an example, a curvelet transform may be viewed as a multiscale pyramid with directions and positions at individual length scales and needle-shaped elements at "fine" scales.

As an example, curvelets, as obtained by applying parabolic dilations, rotations, and translations to a specifically shaped function, for example, consider a function $\psi$. As an example, curvelets may be indexed by a scale parameter a ($0<a<1$), a location b, and an orientation $\theta$ and may be approximately of the form:

$$\psi_{a,b,\theta}(x) = a^{-\frac{3}{4}}\psi(D_a R_\theta(x-b)),$$

$$D_a = \begin{pmatrix} 1/a & 0 \\ 0 & 1/\sqrt{a} \end{pmatrix}.$$

In the foregoing function, $D_a$ is a parabolic scaling matrix, $R_\theta$ is a rotation by $\theta$ radians, and for $(x_1, x_2) \in \mathbb{R}^2$, $\psi(x_1, x_2)$ is a sort of admissible profile (e.g., with analogs in higher dimension). In the foregoing example, geometry of a curvelet may be appreciated, for example, if the function is supported near a unit square, the envelope of $\psi_{a,b,\theta}$ is supported near an a by $\sqrt{a}$ rectangle with a minor axis pointing in the direction $\theta$. As an example, a curvelet transform may refine a scale-space viewpoint, for example, via an orientation (e.g., an orientation element) and by operating by measuring information about an object at specific scales and locations (e.g., along one or more specified orientations). As an example, a curvelet transform may be organized in a manner such that "energy" of an object may be represented by a few coefficients. As an example, curvelets may allow for a "sparse" representation of information such as, for example, information with geometrical structure.

As an example, curvelets may be represented using tiling, for example, consider tiles organized as pie-like segments (e.g., over a number of degrees, etc.). As an example, curvelets may be represented using tiling in a frequency plane. As an example, a curvelet technique can include thresholding (e.g., curvelet thresholding).

As an example, curvelets (e.g., one or more curvelet techniques, etc.) may be implemented to model geometry of wave propagation. As an example, one or more curvelet techniques may be implemented to represent data, analyze data, synthesize data, etc. As an example, data may include signal data, noise data, signal and noise data, etc. As an example, curvelets may be implemented to represent objects that display curve-punctuated smoothness, for example, smoothness except for discontinuity along a general curve with bounded curvature. As an example, information may be represented in a curvelet domain, for example, via transformation via a curvelet transform. As an example, a method may include thresholding of information in a curvelet domain (e.g., curvelet thresholding).

As an example, a method can include performing one or more τ-p types of transforms. As an example, a method can include using a τ-p domain. As an example, an unstacked seismic record or a common-midpoint gather can be described in terms of slope dt/dx=p and intercept time τ, the arrival time obtained by projecting the slope back to x=0, where x is source-sensor distance.

As an example, selection of a transform and domain may depend at least in part on one or more factors such as, for example, dip content and/or frequency content. As an example, a curvelet (e.g., curvelet transform and domain) can be utilized in a manner such that information correspond to dips of various angles can be represented.

As an example, a method can include selecting a range of dips and applying a transform within the range of dips. As an example, a selected range may be based at least in part on amount of noise (e.g., level of noise, etc.).

As an example, a transform and domain may be selected to "capture" noise. For example, where noise includes random noise, such random noise may appear to include dips spanning a wide range of angles; whereas, other types of transforms and domains may be provide for lesser "capture" and/or may involve greater computational demands to cover a span equivalent to that of a curvelet transform and domain (e.g., due to multi-dimensional capabilities of decomposition of curvelets, in time and space, suitable for capturing dips and scales).

As an example, a method can include implementing one or more transforms and domains. For example, consider a first pass that implements curvelets and a second pass that utilizes another approach (e.g., τ-p transform and domain).

As an example, one approach may aim to cover a wide range of dips and another may aim to cover a different range of dips. (e.g., shallow versus steep, etc.). As an example, a τ-p approach can include specifying a maximum dip in a seismic survey. As an example, such an approach may be less demanding, in some scenarios, when compared to use of curvelets.

As an example, a method can include receiving data in a data domain where a first portion of the data domain has a signal to noise ratio that exceeds a signal to noise ratio in a second portion of the data domain; generating a model; in a transform domain, based at least in part on the model, filtering at least a portion of the data in the second portion of the data domain; and, based at least in part on the filtering, outputting noise attenuated data for at least a portion of the data in the second portion of the data domain. In such an example, the generating the model can generate a model based at least in part on the first portion of the data domain.

As an example, generating a model can generate a synthetic model, which may be based at least in part on data in a data domain, for example, consider data in a first portion of the data domain that has a signal to noise ratio that exceeds a signal to noise ratio of data in a second portion of the data domain.

As an example, a method can include receiving seismic data. As an example, such seismic data can include strong, deep interference, which may be present in the data as noise. As an example, seismic data can be data in a domain where a first portion of the data domain has a signal to noise ratio that exceeds a signal to noise ratio in a second portion of the data domain. For example, the second portion of the data domain can include noise due to strong, deep interference.

As an example, a transform domain can be a curvelet domain. As an example, a transform domain can be a τ-p domain.

As an example, noise can be or can include interference noise. As an example, interference noise can be or include noise associated with a shot interval time being shorter than a record time (e.g., where the shot interval and record time correspond to data acquisition parameters of a survey where such data may be received by a computer, a computing system, etc.).

As an example, signal to noise ratio of a second portion of a data domain can be less than unity. For example, consider a signal to noise ratio of approximately 0.1 or less, or approximately 0.01 or less. As an example, a method can include receiving data in a data domain where a first portion and a second portion differ with respect to depth in an environment. For example, the second portion may exhibit strong, deep interference as noise due at least in part to depth of structures in the environment and, for example, due at least in part to one or more survey parameters (e.g., data acquisition parameters, etc.).

As an example, a method can include processing noise attenuated data and interpreting the noise attenuated data.

As an example, a method can include filtering where the filtering includes thresholding. For example, a method can include generating a mask threshold. In such an example, the mask threshold may be based at least in part on a curvelet or curvelets.

As an example, a system can include a processor; memory operatively coupled to the processor; and processor-executable instructions stored in the memory to instruct the system to: receive data in a data domain where a first portion of the data domain has a signal to noise ratio that exceeds a signal to noise ratio in a second portion of the data domain; generate a model; in a transform domain, based at least in part on the model, filter at least a portion of the data in the second portion of the data domain; and, based at least in part on the filter of at least a portion of the data in the second portion of the data domain, output noise attenuated data for at least a portion of the data in the second portion of the data domain. In such an example, the data can be or include seismic data. As an example, a transform domain can be a curvelet domain. As an example, a transform domain can be a τ-p domain.

As an example, noise can be or include interference noise. As an example, interference noise can be more pronounced for a portion of data in a data domain where the portion deeper than another portion of the data. As an example, a method may operate on two portions of data in a data domain and process one portion to be a filter for another portion where the one portion processed to be a filter is at a lesser depth (e.g., times) than the other portion that is to be filtered.

As an example, data can be or include survey data of a subsea geologic environment. As an example, data can be or include survey data of a terrestrial, non-subsea environment. As an example, survey data can be seismic survey data of a geologic environment.

As an example, one or more computer-readable storage media can include processor-executable instructions to instruct a computing system to: receive data in a data domain where a first portion of the data domain has a signal to noise ratio that exceeds a signal to noise ratio in a second portion of the data domain; generate a model; in a transform domain, based at least in part on the model, filter at least a portion of the data in the second portion of the data domain; and based at least in part on the filter of at least a portion of the data in the second portion of the data domain, output noise attenuated data for at least a portion of the data in the second portion of the data domain.

As an example, a method can include receiving data in a data domain where a first portion of the data domain includes a signal to noise ratio that exceeds a signal to noise ratio in a second portion of the domain; generating a model of the signal based at least in part on the first portion of the data domain; transforming the model of the signal and the data to a transform domain; filtering the data in the transform domain using the model of the signal in the transform domain to generate a transform domain noise model; transforming the transform domain noise model to the data domain to generate a data domain noise model; and subtracting the data domain noise model from the data in the data domain. In such an example, the data can include seismic data.

As an example, a method can include receiving data in a data domain where a first portion of the data domain includes a signal to noise ratio that exceeds a signal to noise ratio in a second portion of the domain and such a method can include generating a model based at least in part on the first portion of the data domain. For example, data in the first portion of the data domain can be used to form a model that is more representative of signal because of a higher signal to noise ratio than data in the second portion of the data domain. As an example, a method can include generating a synthetic model, which can be based at least in part on data in a portion of a data domain. For example, where a method includes receiving data in a data domain where a first portion of the data domain includes a signal to noise ratio that exceeds a signal to noise ratio in a second portion of the domain, a synthetic model (e.g., or synthetic) may be generated based at least in part on data in the first portion of the data domain.

As an example, a transform domain may be a curvelet domain or another type of domain, for example, a domain that differs from a data domain (e.g., a domain in which data may be provided, received, etc.).

As an example, data can include noise such as, for example, interference noise or one or more other types of noise. In such an example, interference noise may be, for example, noise associated with a shot interval time being shorter than a record time.

As an example, a method can include generating a model, at least in part, by defining a window based at least in part on at least one signal to noise ratio. As an example, data may be in a data domain where in a portion of the data domain the data includes a signal to noise ratio that may be less than unity (e.g., noise has a greater value, energy, etc. than signal). As an example, a signal to noise ratio of a portion of a data domain may be less than approximately 0.5 (e.g., where noise may be considerably greater than signal). As an example, in at least a portion of data domain, signal may be undetectable to the eye when compared to noise (e.g., noise greater than signal).

As an example, a method can include subtracting a data domain noise model from the data in a data domain to attenuate noise in the data. In such an example, the data domain noise model may be a result of a transform of a transform domain noise model generated in a transform domain. As an example, a method can include subtracting a noise model from data to generate noise attenuated data in a data domain. In such an example, the method may further include processing the noise attenuated data, interpreting the noise attenuated data, computing one or more attributes (e.g., "seismic" attributes, etc.), etc.

As an example, data may be survey data where, for example, a first portion of the data and a second portion of the data differ with respect to depth in an environment.

As an example, a method can include filtering via thresholding. For example, consider a method that includes domain thresholding to generate a noise model. For example, curvelet domain thresholding may be implemented as part of a method to generate a noise model that can be transformed to a data domain and applied to data to attenuate noise.

As an example, a system can include a processor; memory operatively coupled to the processor; and processor-executable instructions stored in the memory to instruct the system to: generate a model of signal in data in a data domain based at least in part on a portion of the data domain; transform the model of the signal and the data to a transform domain; filter the data in the transform domain using the model of the signal in the transform domain to generate a transform domain noise model; transform the transform domain noise model to the data domain to generate a data domain noise model; and subtract the data domain noise model from the data in the data domain.

As an example, one or more computer-readable storage media can include processor-executable instructions to instruct a computing system to: generate a model of signal in data in a data domain based at least in part on a portion of the data domain; transform the model of the signal and the data to a transform domain; filter the data in the transform domain using the model of the signal in the transform domain to generate a transform domain noise model; transform the transform domain noise model to the data domain to generate a data domain noise model; and subtract the data domain noise model from the data in the data domain.

As an example, a system may include one or more modules, which may be provided to analyze data, control a process, perform a task, perform a workstep, perform a workflow, etc.

Figure 19:
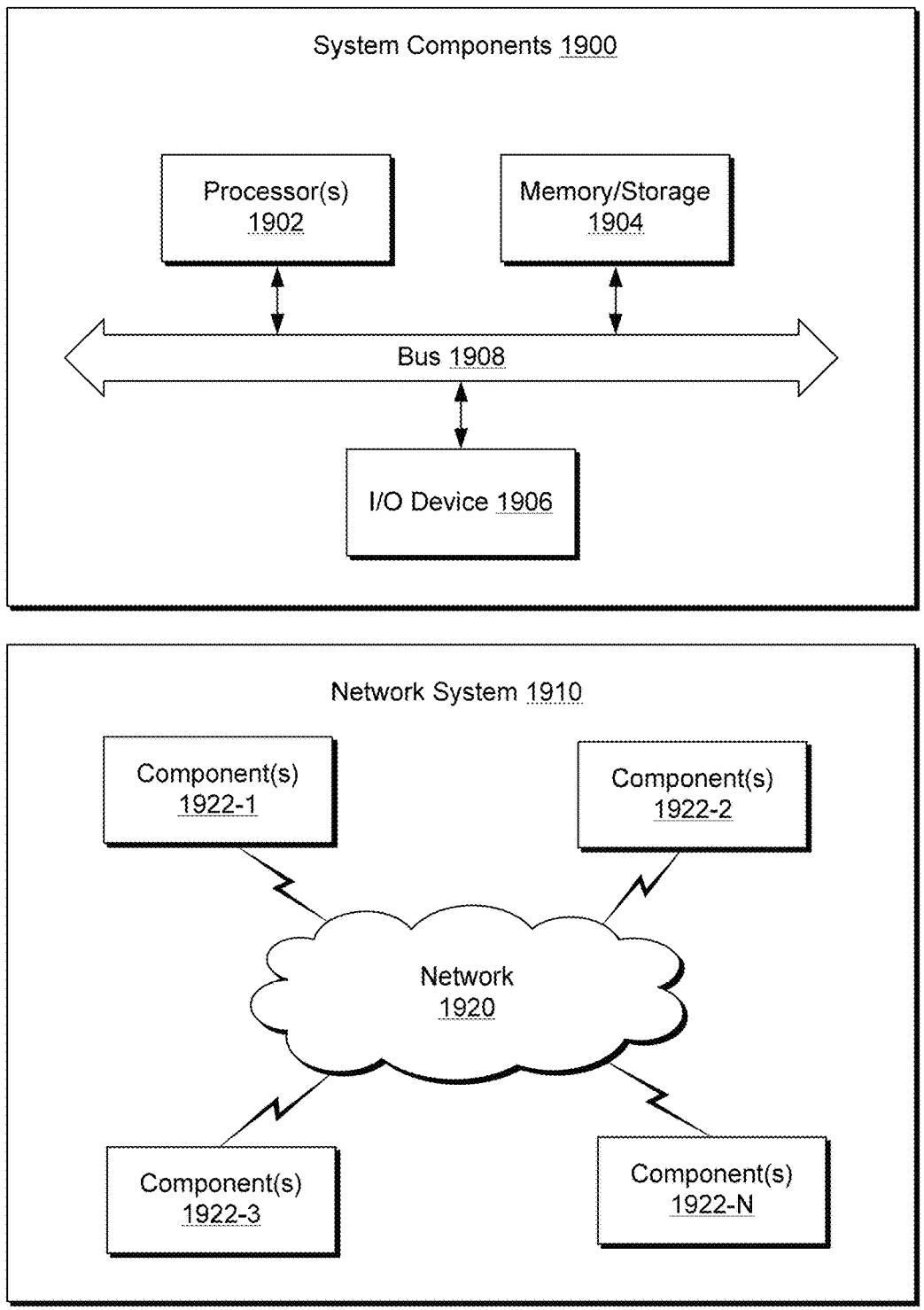
FIG. 19 illustrates example components of a system and a networked system.

FIG. 19 shows components of an example of a computing system 1900 and an example of a networked system 1910. The system 1900 includes one or more processors 1902, memory and/or storage components 1904, one or more input and/or output devices 1906 and a bus 1908. In an example embodiment, instructions may be stored in one or more computer-readable media (e.g., memory/storage components 1904). Such instructions may be read by one or more processors (e.g., the processor(s) 1902) via a communication bus (e.g., the bus 1908), which may be wired or wireless. The one or more processors may execute such instructions to implement (wholly or in part) one or more attributes (e.g., as part of a method). A user may view output from and interact with a process via an I/O device (e.g., the device 1906). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1910. The network system 1910 includes components 1922-1, 1922-2, 1922-3, . . . 1922-N. For example, the components 1922-1 may include the processor(s) 1902 while the component(s)

1922-3 may include memory accessible by the processor(s) 1902. Further, the component(s) 1902-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
    receiving seismic data of a subterranean region in a data domain wherein a first portion of the data domain comprises a signal to noise ratio that exceeds a signal to noise ratio in a second portion of the data domain;
    generating a model, wherein generating the model generates a model based at least in part on the first portion of the data domain;
    in a transform domain, based at least in part on the model, filtering at least a portion of the seismic data in the second portion of the data domain;
    based at least in part on the filtering, outputting noise attenuated seismic data for at least a portion of the seismic data in the second portion of the data domain; and
    controlling equipment of a field operation with respect to the subterranean region based at least in part on using the output noise attenuated seismic data to identify a structure in the subterranean region.

2. The method of claim 1 wherein generating the model generates a synthetic model.

3. The method of claim 1 wherein the transform domain comprises a curvelet domain.

4. The method of claim 1 wherein the transform domain comprises a $\tau$-p domain.

5. The method of claim 1 wherein the noise comprises interference noise.

6. The method of claim 5 wherein the interference noise comprises noise associated with a shot interval time being shorter than a record time.

7. The method of claim 1 wherein the signal to noise ratio of the second portion is less than unity.

8. The method of claim 1 further comprising processing the noise attenuated data and interpreting the noise attenuated data.

9. The method of claim 1 wherein the first portion and the second portion differ with respect to depth in an environment.

10. The method of claim 1 wherein the filtering comprises thresholding.

11. A system comprising:
    a processor;
    memory operatively coupled to the processor; and
    processor-executable instructions stored in the memory to instruct the system to:
        receive seismic data of a subterranean region in a data domain wherein a first portion of the data domain comprises a signal to noise ratio that exceeds a signal to noise ratio in a second portion of the data domain;
        generate a model based at least in part on the first portion of the data domain;
        in a transform domain, based at least in part on the model, filter at least a portion of the data in the second portion of the data domain;
        based at least in part on the filter of at least a portion of the data in the second portion of the data domain, output noise attenuated data for at least a portion of the data in the second portion of the data domain; and
        control equipment of a field operation with respect to the subterranean region based at least in part on use of the output noise attenuated seismic data to identify a structure in the subterranean region.

12. The system of claim 11 wherein the transform domain comprises a curvelet domain.

13. The system of claim 11 wherein the transform domain comprises a $\tau$-p domain.

14. The system of claim 11 wherein the noise comprises interference noise.

15. The system of claim 11 wherein the first portion and the second portion differ with respect to depth in an environment.

16. The system of claim 11 wherein the data comprises survey data of a subsea geologic environment.

17. One or more computer-readable storage media comprising processor-executable instructions to instruct a computing system to:
- receive seismic data of a subterranean region in a data domain wherein a first portion of the data domain comprises a signal to noise ratio that exceeds a signal to noise ratio in a second portion of the data domain;
- generate a model based at least in part on the first portion of the data domain;
- in a transform domain, based at least in part on the model, filter at least a portion of the data in the second portion of the data domain;
- based at least in part on the filter of at least a portion of the data in the second portion of the data domain, output noise attenuated data for at least a portion of the data in the second portion of the data domain; and
- control equipment of a field operation with respect to the subterranean region based at least in part on use of the output noise attenuated seismic data to identify a structure in the subterranean region.

* * * * *